(12) United States Patent
Zhou et al.

(10) Patent No.: US 11,963,184 B2
(45) Date of Patent: Apr. 16, 2024

(54) SCHEDULING FULL-DUPLEX SIDELINK COMMUNICATIONS

(71) Applicant: QUALCOMM Incorporated, San Diego, CA (US)

(72) Inventors: Yan Zhou, San Diego, CA (US); Qian Zhang, Basking Ridge, NJ (US); Sony Akkarakaran, Poway, CA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 17/398,885

(22) Filed: Aug. 10, 2021

(65) Prior Publication Data

US 2023/0050681 A1 Feb. 16, 2023

(51) Int. Cl.
*H04W 72/20* (2023.01)
*H04W 72/23* (2023.01)

(52) U.S. Cl.
CPC ........... *H04W 72/23* (2023.01); *H04W 72/20* (2023.01)

(58) Field of Classification Search
CPC .............................. H04W 72/23; H04W 72/20
See application file for complete search history.

(56) References Cited

U.S. PATENT DOCUMENTS

| | | | |
|---|---|---|---|
| 2015/0045018 A1* | 2/2015 | Liu | H04W 76/14 455/426.1 |
| 2015/0189642 A1* | 7/2015 | Yang | H04W 72/51 370/329 |
| 2023/0057558 A1* | 2/2023 | Lim | H04W 8/24 |
| 2023/0063901 A1* | 3/2023 | Zhao | H04L 1/1887 |
| 2023/0066942 A1* | 3/2023 | Liu | H04W 72/56 |
| 2023/0085465 A1* | 3/2023 | Lee | H04L 1/1887 370/329 |
| 2023/0102454 A1* | 3/2023 | Yoshioka | H04W 72/25 370/329 |

\* cited by examiner

*Primary Examiner* — John D Blanton
(74) *Attorney, Agent, or Firm* — Holland & Hart LLP

(57) ABSTRACT

Methods, systems, and devices for wireless communications are described. In some examples, a user equipment (UE) may be scheduled by a base station for full-duplex sidelink transmissions. A first UE may receive, from a base station, a first sidelink grant indicating a first set of resources and a second set of resources. The first set of resources may at least partially overlap in time with the second set of resources. Upon receiving the first sidelink, the first UE may transmit, to a second wireless device, a second sidelink grant indicating the second set of resources. The first UE may transmit a first data message to the second UE over the first set of resources and receive a second data message from the second device over the second set of resources.

30 Claims, 15 Drawing Sheets

SCHEDULING FULL-DUPLEX SIDELINK COMMUNICATIONS

FIELD OF TECHNOLOGY

The following relates to wireless communications, including scheduling full-duplex sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a wireless communication system may support sidelink communication or communication between two or more UEs. In some examples, UEs may communicate with one another in a half-duplex manner or in a full-duplex manner. In half-duplex, a device may transmit signals and receive signals at different times (e.g., over two different sets of time resources). In full-duplex, a device may concurrently transmit signals and receive signals (e.g., over the same time resources, and hence during a same time period).

SUMMARY

The described techniques relate to improved methods, systems, devices, and apparatuses that support scheduling full-duplex sidelink communications. Generally, the described techniques provide for scheduling a set of UEs for full-duplex sidelink transmissions. In some examples, a first UE and a second UE may be capable of full-duplex communications. Additionally, the first UE may have pending data to transmit to a second UE and the second UE may have pending data to transmit the first UE. In such examples, a base station may transmit a first sidelink grant to the first UE indicating a first set of resources for transmission of a data message from the first UE to the second UE and a second set of resources for transmission of a data message from the second UE to the first UE, where the first set of resources at least partially overlaps with the second set of resources in the time domain. The first UE may then transmit a second sidelink grant to the second UE indicating at least the second set of resources. Upon receiving the second sidelink grant, the second UE may transmit a data message to the second UE over the second set of resources and the first UE may transmit a data message to the second UE over the first set of resources. In some examples, the first UE and the second UE may report feedback information related to the received data messages to the base station in either a joint fashion or in a separate fashion. The methods as described herein may enable full-duplex communication between UEs which may increase spectral efficiency and latency when compared to half-duplex communication.

A method for wireless communication at a first wireless device is described. The method may include receiving, from a base station, a first sidelink grant indicating a first set of resources and a second set of resources, where the first set of resources at least partially overlaps in time with the second set of resources, transmitting, to a second wireless device, a second sidelink grant indicating the second set of resources, transmitting, to the second wireless device, a first data message over the first set of resources based on the first sidelink grant, the second sidelink grant, or both, and receiving, from the second wireless device, a second data message over the second set of resources based on the first sidelink grant, the second sidelink grant, or both.

An apparatus for wireless communication at a first wireless device is described. The apparatus may include a processor, memory coupled with the processor, and instructions stored in the memory. The instructions may be executable by the processor to cause the apparatus to receive, from a base station, a first sidelink grant indicating a first set of resources and a second set of resources, where the first set of resources at least partially overlaps in time with the second set of resources, transmit, to a second wireless device, a second sidelink grant indicating the second set of resources, transmit, to the second wireless device, a first data message over the first set of resources based on the first sidelink grant, the second sidelink grant, or both, and receive, from the second wireless device, a second data message over the second set of resources based on the first sidelink grant, the second sidelink grant, or both.

Another apparatus for wireless communication at a first wireless device is described. The apparatus may include means for receiving, from a base station, a first sidelink grant indicating a first set of resources and a second set of resources, where the first set of resources at least partially overlaps in time with the second set of resources, means for transmitting, to a second wireless device, a second sidelink grant indicating the second set of resources, means for transmitting, to the second wireless device, a first data message over the first set of resources based on the first sidelink grant, the second sidelink grant, or both, and means for receiving, from the second wireless device, a second data message over the second set of resources based on the first sidelink grant, the second sidelink grant, or both.

A non-transitory computer-readable medium storing code for wireless communication at a first wireless device is described. The code may include instructions executable by a processor to receive, from a base station, a first sidelink grant indicating a first set of resources and a second set of resources, where the first set of resources at least partially overlaps in time with the second set of resources, transmit, to a second wireless device, a second sidelink grant indicating the second set of resources, transmit, to the second wireless device, a first data message over the first set of resources based on the first sidelink grant, the second sidelink grant, or both, and receive, from the second wireless device, a second data message over the second set of resources based on the first sidelink grant, the second sidelink grant, or both.

In some examples of the method, apparatuses, and non-transitory computer-readable medium described herein, generating, at the first wireless device, feedback information related to the second data message, receiving, from the second wireless device, feedback information related to the first data message, and transmitting, to the base station, the feedback information related to the first data message and the feedback information related to the second data message based on the first sidelink grant.

In some examples of the method, apparatuses, and non-transitory computer-readable medium described herein, generating, at the first wireless device, feedback information related to the second data message, transmitting, to the second wireless device, the feedback information related to the second data message, receiving, from the second wireless device, feedback information related to the first data message, and transmitting, to the base station, the feedback information related to the first data message.

In some examples of the method, apparatuses, and non-transitory computer-readable medium described herein, the first sidelink grant indicates a format of the second sidelink grant, a time gap between reception of the first sidelink grant and transmission of the second sidelink grant, a radio network temporary identifier (RNTI) for inclusion in the second sidelink grant, a UE identifier (ID) associated with a wireless device transmitting the second sidelink grant, a UE ID associated with a wireless device receiving the second sidelink grant, or any combination thereof.

In some examples of the method, apparatuses, and non-transitory computer-readable medium described herein, the first sidelink grant includes scheduling information for the first data message and scheduling information for the second data message.

In some examples of the method, apparatuses, and non-transitory computer-readable medium described herein, at least one of the scheduling information for the first data message and the scheduling information for the second data message includes a sidelink resource pool ID, a hybrid automatic repeat request (HARQ) process ID, a new data indicator (NDI), a counter sidelink assignment index, a sidelink time and frequency resource allocation, a sidelink demodulation reference signal (DMRS) pattern, a quantity of sidelink DMRS ports and corresponding sidelink DMRS IDs, a transmit precoding matrix ID, a transmit beam ID or a receive beam ID for half-duplex communication between the first wireless device and the second wireless device, a transmit beam ID or a receive beam ID for full-duplex communication between the first wireless device and the second wireless device, a sidelink power control parameter, a modulation and coding scheme (MCS) ID, a MCS table ID, a component carrier (CC) ID, a bandwidth part (BWP) ID, a semi-persistent scheduling (SPS) configuration ID, a cell group (CG) configuration ID, or any combination thereof.

In some examples of the method, apparatuses, and non-transitory computer-readable medium described herein, the second sidelink grant includes scheduling information for the first data message and scheduling information for the second data message.

In some examples of the method, apparatuses, and non-transitory computer-readable medium described herein, at least one of the scheduling information for the first data message and the scheduling information for the second data message includes a sidelink priority, a sidelink time and frequency resource allocation, a sidelink DMRS pattern, a quantity of sidelink DMRS ports and corresponding sidelink DMRS IDs, a MCS ID, a MCS table ID, a format for a physical sidelink feedback channel (PSFCH), a format of a second stage sidelink control information (SCI) and corresponding offset value, a beam ID for receiving or transmitting the second stage SCI, the first data message or the second data message, a precoding matrix ID (PMI), a transmit PMI (TPMI), or any combination thereof.

In some examples of the method, apparatuses, and non-transitory computer-readable medium described herein, at least one of the scheduling information for the first data message and the scheduling information for the second data message includes a HARQ process ID, NDI, a redundant version (RV) index, an ID associated with the first wireless device or the second wireless device, an indication that HARQ feedback may be enabled, a cast type indicator, channel state information (CSI) request indicator, a zone ID, an indication of a communications range, or any combination thereof.

In some examples of the method, apparatuses, and non-transitory computer-readable medium described herein, the second sidelink grant includes a reverse link grant corresponding to the second data message and a forward link grant corresponding to the first data message, the reverse link grant and the forward link grant indicating different sets of parameters.

In some examples of the method, apparatuses, and non-transitory computer-readable medium described herein, the first data message corresponds to a forward link transmission and the second data message corresponds to a reverse link transmission.

In some examples of the method, apparatuses, and non-transitory computer-readable medium described herein, the second sidelink grant includes first stage SCI and second stage SCI.

Some examples of the method, apparatuses, and non-transitory computer-readable medium described herein may further include operations, features, means, or instructions for receiving the first sidelink grant may be based on a capability of the first wireless device, a link quality between the first wireless device and the base station, or any combination thereof.

A method for wireless communication at a second wireless device is described. The method may include receiving, from a first wireless device, a sidelink grant indicating a first set of resources for a first data message and a second set of resources for a second data message, where the first set of resources at least partially overlaps in time with the second set of resources, receiving, from the first wireless device, the first data message over the first set of resources based on the sidelink grant, and transmitting, to the first wireless device, the second data message over the second set of resources based on the sidelink grant.

An apparatus for wireless communication at a second wireless device is described. The apparatus may include a processor, memory coupled with the processor, and instructions stored in the memory. The instructions may be executable by the processor to cause the apparatus to receive, from a first wireless device, a sidelink grant indicating a first set of resources for a first data message and a second set of resources for a second data message, where the first set of resources at least partially overlaps in time with the second set of resources, receive, from the first wireless device, the first data message over the first set of resources based on the sidelink grant, and transmit, to the first wireless device, the second data message over the second set of resources based on the sidelink grant.

Another apparatus for wireless communication at a second wireless device is described. The apparatus may include means for receiving, from a first wireless device, a sidelink grant indicating a first set of resources for a first data message and a second set of resources for a second data message, where the first set of resources at least partially overlaps in time with the second set of resources, means for receiving, from the first wireless device, the first data message over the first set of resources based on the sidelink grant, and means for transmitting, to the first wireless device, the second data message over the second set of resources based on the sidelink grant.

A non-transitory computer-readable medium storing code for wireless communication at a second wireless device is described. The code may include instructions executable by a processor to receive, from a first wireless device, a sidelink grant indicating a first set of resources for a first data message and a second set of resources for a second data message, where the first set of resources at least partially overlaps in time with the second set of resources, receive, from the first wireless device, the first data message over the first set of resources based on the sidelink grant, and transmit, to the first wireless device, the second data message over the second set of resources based on the sidelink grant.

In some examples of the method, apparatuses, and non-transitory computer-readable medium described herein, generating, at the second wireless device, feedback information related to the first data message and transmitting, to the first wireless device, the feedback information related to the first data message.

In some examples of the method, apparatuses, and non-transitory computer-readable medium described herein, generating, at the second wireless device, feedback information related to the first data message, transmitting, to the first wireless device, the feedback information related to the first data message, receiving, from the first wireless device, feedback information related to the second data message, and transmitting, to a base station, the feedback information related to the second data message.

In some examples of the method, apparatuses, and non-transitory computer-readable medium described herein, the sidelink grant includes scheduling information for the first data message and scheduling information for the second data message.

In some examples of the method, apparatuses, and non-transitory computer-readable medium described herein, at least one of the scheduling information for the first data message and the scheduling information for the second data message includes a sidelink priority, a sidelink time and frequency resource allocation, a sidelink DMRS pattern, a quantity of sidelink DMRS ports and corresponding sidelink DMRS IDs, a MCS ID, a MCS table ID, a format for a PSFCH, a format of a second stage SCI and corresponding offset value, a beam ID for receiving or transmitting the second stage SCI, the first data message or the second data message, a PMI, a TPMI, or any combination thereof.

In some examples of the method, apparatuses, and non-transitory computer-readable medium described herein, at least one of the scheduling information for the first data message and the scheduling information for the second data message includes a HARQ process ID, NDI, a RV index, an ID associated with the first wireless device or the second wireless device, an indication that HARQ feedback may be enabled, a cast type indicator, CSI request indicator, a zone ID, an indication of a communications range, or any combination thereof.

In some examples of the method, apparatuses, and non-transitory computer-readable medium described herein, the first data message corresponds to a forward link transmission and the second data message corresponds to a reverse link transmission.

In some examples of the method, apparatuses, and non-transitory computer-readable medium described herein, the sidelink grant includes first stage SCI and second stage SCI.

A method for wireless communication at a first wireless device is described. The method may include receiving, from a base station, a first sidelink grant indicating a first set of resources, transmitting, to a second wireless device, a second sidelink grant indicating at least the first set of resources, transmitting, to the second wireless device, a first data message over the first set of resources based on the first sidelink grant, the second sidelink grant, or both, receiving, from the second wireless device, a second data message over a second set of resources, where the second set of resources at least partially overlaps in time with the first set of resources, receiving, from the second wireless device, feedback information related to the first data message, and transmitting, to the base station, the feedback information related to the first data message.

An apparatus for wireless communication at a first wireless device is described. The apparatus may include a processor, memory coupled with the processor, and instructions stored in the memory. The instructions may be executable by the processor to cause the apparatus to receive, from a base station, a first sidelink grant indicating a first set of resources, transmit, to a second wireless device, a second sidelink grant indicating at least the first set of resources, transmit, to the second wireless device, a first data message over the first set of resources based on the first sidelink grant, the second sidelink grant, or both, receive, from the second wireless device, a second data message over a second set of resources, where the second set of resources at least partially overlaps in time with the first set of resources, receive, from the second wireless device, feedback information related to the first data message, and transmit, to the base station, the feedback information related to the first data message.

Another apparatus for wireless communication at a first wireless device is described. The apparatus may include means for receiving, from a base station, a first sidelink grant indicating a first set of resources, means for transmitting, to a second wireless device, a second sidelink grant indicating at least the first set of resources, means for transmitting, to the second wireless device, a first data message over the first set of resources based on the first sidelink grant, the second sidelink grant, or both, means for receiving, from the second wireless device, a second data message over a second set of resources, where the second set of resources at least partially overlaps in time with the first set of resources, means for receiving, from the second wireless device, feedback information related to the first data message, and means for transmitting, to the base station, the feedback information related to the first data message.

A non-transitory computer-readable medium storing code for wireless communication at a first wireless device is described. The code may include instructions executable by a processor to receive, from a base station, a first sidelink grant indicating a first set of resources, transmit, to a second wireless device, a second sidelink grant indicating at least the first set of resources, transmit, to the second wireless device, a first data message over the first set of resources based on the first sidelink grant, the second sidelink grant, or both, receive, from the second wireless device, a second data message over a second set of resources, where the second set of resources at least partially overlaps in time with the first set of resources, receive, from the second wireless device, feedback information related to the first data message, and transmit, to the base station, the feedback information related to the first data message.

In some examples of the method, apparatuses, and non-transitory computer-readable medium described herein, generating, at the first wireless device, feedback information related to the second data message and transmitting, with the feedback information related to the first data message, the feedback information related to the second data message.

In some examples of the method, apparatuses, and non-transitory computer-readable medium described herein, the first sidelink grant includes scheduling information for the first data message, the scheduling information indicating a format of the second sidelink grant, a time gap between reception of the first sidelink grant and transmission of the second sidelink grant, an RNTI for inclusion in the second sidelink grant, a UE ID associated a wireless device transmitting the second sidelink grant, a UE ID associated with a wireless device receiving the second sidelink grant, or any combination thereof.

In some examples of the method, apparatuses, and non-transitory computer-readable medium described herein, the first sidelink grant includes scheduling information for the first data message, the scheduling information including a sidelink resource pool ID, a HARQ process ID, a NDI, a counter sidelink assignment index, a sidelink time and frequency resource allocation, a sidelink DMRS pattern, a quantity of sidelink DMRS ports and corresponding sidelink DMRS IDs, a transmit PMI, a transmit beam ID or a receive beam ID for half-duplex communication between the first wireless device and the second wireless device, a transmit beam ID or a receive beam ID for full-duplex communication between the first wireless device and the second wireless device, a sidelink power control parameter, a MCS ID, a MCS table ID, a CC ID, a BWP ID, a semi-persistent scheduling configuration ID, a CG configuration ID, or any combination thereof.

In some examples of the method, apparatuses, and non-transitory computer-readable medium described herein, the second sidelink grant includes scheduling information for the first data message, the scheduling information including a sidelink priority, a sidelink time and frequency resource allocation, a sidelink DMRS pattern, a quantity of sidelink DMRS ports and corresponding sidelink DMRS IDs, a MCS ID, a MCS table ID, a format for a PSFCH, a format of a second stage SCI and corresponding offset value, a beam ID for receiving or transmitting the second stage SCI, the first data message or the second data message, a PMI, a TPMI, or any combination thereof.

In some examples of the method, apparatuses, and non-transitory computer-readable medium described herein, the second sidelink grant includes scheduling information for the first data message, the scheduling information including a HARQ process ID, NDI, a RV index, an ID associated with the first wireless device or the second wireless device, an indication that HARQ feedback may be enabled, a cast type indicator, CSI request indicator, a zone ID, an indication of a communications range, or any combination thereof.

In some examples of the method, apparatuses, and non-transitory computer-readable medium described herein, the first data message corresponds to a forward link transmission and the second data message corresponds to a forward link transmission, the first data message corresponds to a reverse link transmission and the second data message corresponds to a reverse link transmission, and a first one of the first data message and the second data message corresponds to a forward link transmission and a second one of the first data message and the second data message corresponds to a reverse link transmission.

In some examples of the method, apparatuses, and non-transitory computer-readable medium described herein, the second sidelink grant includes first stage SCI and second stage SCI.

A method for wireless communication at a second wireless device is described. The method may include receiving, from a base station, a first sidelink grant indicating a first set of resources, transmitting, to a first wireless device, a second sidelink grant indicating at least the first set of resources, transmitting, to the first wireless device, a first data message over the first set of resources based on the first sidelink grant, the second sidelink grant, or both, receiving, from the first wireless device, a second data message over a second set of resources, where the second set of resources at least partially overlaps in time with the first set of resources, and transmitting, to one of the base station or the first UE, feedback information related to the second data message.

An apparatus for wireless communication at a second wireless device is described. The apparatus may include a processor, memory coupled with the processor, and instructions stored in the memory. The instructions may be executable by the processor to cause the apparatus to receive, from a base station, a first sidelink grant indicating a first set of resources, transmit, to a first wireless device, a second sidelink grant indicating at least the first set of resources, transmit, to the first wireless device, a first data message over the first set of resources based on the first sidelink grant, the second sidelink grant, or both, receive, from the first wireless device, a second data message over a second set of resources, where the second set of resources at least partially overlaps in time with the first set of resources, and transmit, to one of the base station or the first UE, feedback information related to the second data message.

Another apparatus for wireless communication at a second wireless device is described. The apparatus may include means for receiving, from a base station, a first sidelink grant indicating a first set of resources, means for transmitting, to a first wireless device, a second sidelink grant indicating at least the first set of resources, means for transmitting, to the first wireless device, a first data message over the first set of resources based on the first sidelink grant, the second sidelink grant, or both, means for receiving, from the first wireless device, a second data message over a second set of resources, where the second set of resources at least partially overlaps in time with the first set of resources, and means for transmitting, to one of the base station or the first UE, feedback information related to the second data message.

A non-transitory computer-readable medium storing code for wireless communication at a second wireless device is described. The code may include instructions executable by a processor to receive, from a base station, a first sidelink grant indicating a first set of resources, transmit, to a first wireless device, a second sidelink grant indicating at least the first set of resources, transmit, to the first wireless device, a first data message over the first set of resources based on the first sidelink grant, the second sidelink grant, or both, receive, from the first wireless device, a second data message over a second set of resources, where the second set of resources at least partially overlaps in time with the first set of resources, and transmit, to one of the base station or the first UE, feedback information related to the second data message.

In some examples of the method, apparatuses, and non-transitory computer-readable medium described herein, the first sidelink grant includes scheduling information for the first data message, the scheduling information indicating a format of the second sidelink grant, a time gap between reception of the first sidelink grant and transmission of the second sidelink grant, an RNTI for inclusion in the second sidelink grant, a UE ID associated with a wireless device transmitting the second sidelink grant, a UE ID associated with a wireless device receiving the second sidelink, or any combination thereof.

In some examples of the method, apparatuses, and non-transitory computer-readable medium described herein, the first sidelink grant includes scheduling information for the first data message, the scheduling information including a sidelink resource pool ID, a HARQ process ID, a NDI, a counter sidelink assignment index, a sidelink time and frequency resource allocation, a sidelink DMRS pattern, a quantity of sidelink DMRS ports and corresponding sidelink DMRS IDs, a transmit PMI, a transmit beam ID or a receive beam ID for half-duplex communication between the first wireless device and the second wireless device, a transmit beam ID or a receive beam ID for full-duplex communication between the first wireless device and the second wireless device, a sidelink power control parameter, a MCS ID, a MCS table ID, a CC ID, a BWP ID, a semi-persistent scheduling configuration ID, a CG configuration ID, or any combination thereof.

In some examples of the method, apparatuses, and non-transitory computer-readable medium described herein, the second sidelink grant includes scheduling information for the first data message, the scheduling information including a sidelink priority, a sidelink time and frequency resource allocation, a sidelink DMRS pattern, a quantity of sidelink DMRS ports and corresponding sidelink DMRS IDs, a MCS ID, a MCS table ID, a format for a PSFCH, a format of a second stage SCI and corresponding offset value, a beam ID for receiving or transmitting the second stage SCI, the first data message or the second data message, a PMI, a TPMI, or any combination thereof.

In some examples of the method, apparatuses, and non-transitory computer-readable medium described herein, the second sidelink grant includes scheduling information for the first data message, the scheduling information including a HARQ process ID, NDI, a RV index, an ID associated with the first wireless device or the second wireless device, an indication that HARQ feedback may be enabled, a cast type indicator, CSI request indicator, a zone ID, an indication of a communications range, or any combination thereof.

In some examples of the method, apparatuses, and non-transitory computer-readable medium described herein, the first data message corresponds to a forward link transmission and the second data message corresponds to a forward link transmission, the first data message corresponds to a reverse link transmission and the second data message corresponds to a reverse link transmission, and a first one of the first data message and the second data message corresponds to a forward link transmission and a second one of the first data message and the second data message corresponds to a reverse link transmission.

In some examples of the method, apparatuses, and non-transitory computer-readable medium described herein, the second sidelink grant includes first stage SCI and second stage SCI.

DETAILED DESCRIPTION

Figure 1:
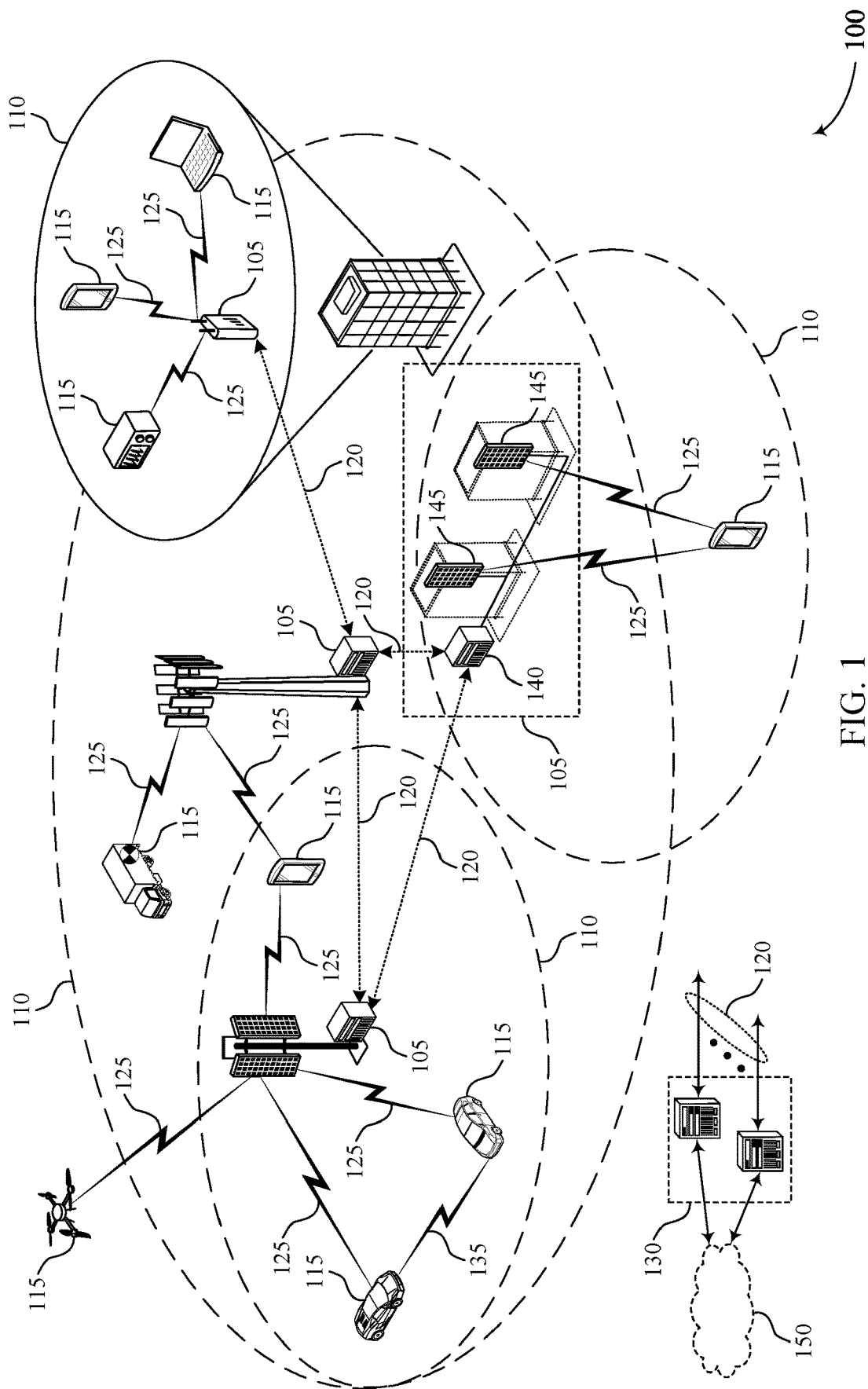
FIGS. 1 and 2 illustrate examples of a wireless communications system that supports scheduling full-duplex sidelink communications in accordance with aspects of the present disclosure.

In some examples, a wireless communications system may support sidelink communication or communication between two or more user equipment (UEs). In some examples, a base station may transmit a grant to UEs scheduling sidelink communications (e.g., when operating in sidelink resource allocation mode 1). For example, a base station may transmit a grant to a first UE indicating sidelink resources on which the first UE may communicate with a second UE. In some examples, two UEs in communication with one another may be capable of full-duplex communications. Full-duplex may refer to a capability or related mode of operation in which a wireless device simultaneously transmits and receives different signals. Thus, for example, a first UE operating in full-duplex may transmit a first data message to the second UE and receive a second data message from the second UE over the same time resources. Improved solutions for scheduling full-duplex sidelink operations between UEs may be desired.

As described herein, a base station may schedule UEs for full-duplex sidelink operations using techniques that provide reduced signaling overhead, reduced latency, or both, among other potential benefits. In one example, the base station may transmit a first sidelink grant to a UE for full-duplex communications between two UEs. For example, the base station may transmit a sidelink grant to a first UE indicating a first set of resources and a second set of resources, where the first set of resources at least partially overlap the second set of resources in the time domain. In response to the grant, the first UE may transmit a second grant to a second UE indicating the second set of resources. The first UE may transmit a data message to the second UE over the first set of resource and the second UE may transmit a second data message to the first UE over the second set of resources. In some cases, upon receiving the second data message from the second UE, the first UE may generate feedback related to the second data message, collect feedback related to the first data message from the second UE, and transmit all of the feedback information to the base station. Alternatively, the first UE may transmit the feedback related to the second data message to the second UE, receive feedback information related to the first data message from the second UE, and transmit the feedback information related to the first data message to the base station. As another example, the base station may transmit two sidelink grants to two UEs for full-duplex communication between the two UEs. Such scheduling techniques as outlined above may allow for sidelink full-duplex operations between UEs, including with reduced signaling overhead, reduced latency, or both, among other potential benefits.

Aspects of the disclosure are initially described in the context of wireless communications systems. Additional aspects of the disclosure are described in the context of process flows. Aspects of the disclosure are further illustrated by and described with reference to apparatus diagrams, system diagrams, and flowcharts that relate to scheduling full-duplex sidelink communications.

FIG. 1 illustrates an example of a wireless communications system 100 that supports scheduling full-duplex sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers (CCs) and one or more uplink CCs according to a carrier aggregation configuration. Carrier aggregation may be used with both frequency division duplexing (FDD) and time division duplexing (TDD) CCs.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, a base station 105 may schedule a UE 115 for full-duplex sidelink transmissions. In some examples, a first UE 115 and a second UE 115 may be capable of full-duplex communications. Additionally, the first UE 115 may have pending data to transmit to a second UE 115 and the second UE 115 may have pending data to transmit the first UE 115. In such examples, the base station may transmit a first sidelink grant to a first UE 115 indicating a first set of resources for transmission of a data message from the first UE 115 to the second UE 115 and a second set of resources for transmission of a data message from the second UE 115 to the first UE 115, where the first set of resources at least partially overlaps with the second set of resources in the time domain. The first UE 115 may then transmit a second sidelink grant to the second UE 115 indicating at least the second set of resources. Upon receiving the second sidelink grant, the second UE 115 may transmit the data message to the second UE 115 over the second set of resources and the first UE 115 may transmit the data message to the second UE 115 over the first set of resources. In some examples, the first UE 115 and the second UE 115 may report feedback information related to the received data message to the base station 105 in either a joint fashion or in a separate fashion. The methods as described herein may provide for improved scheduling of full-duplex communications between UEs 115 which may increase spectral efficiency and latency when compared to half-duplex communication. Additionally or alternatively, scheduling of full-duplex communications as described herein may provide for reduced signaling overhead or other performance benefits relative to other techniques for scheduling of full-duplex communications. Additionally or alternatively, the methods as described herein may allow UEs 115 to provide feedback (joint or separate) related to full-duplex sidelink communications to the network which may increase communication reliability and coordination between devices.

Figure 2:
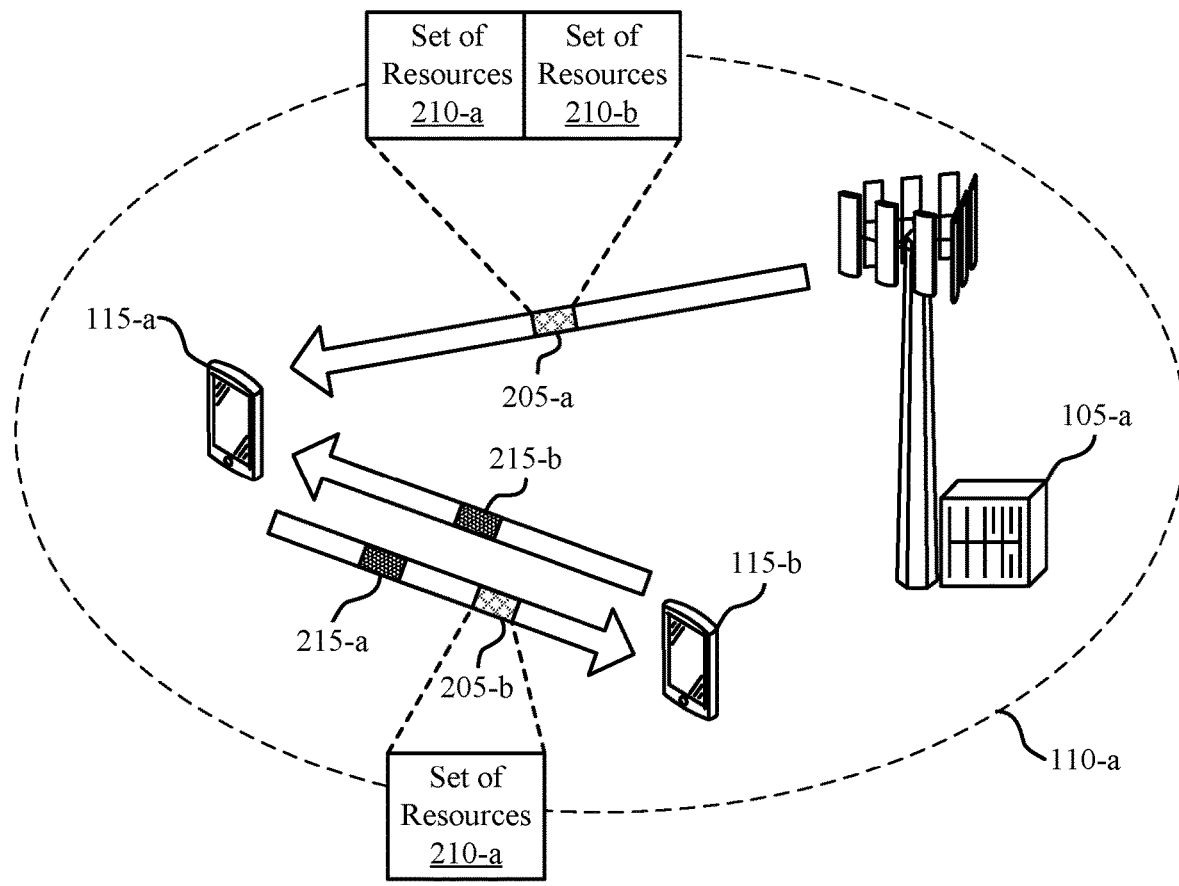

FIG. 2 illustrates an example of a wireless communications system 200 that supports scheduling full-duplex sidelink communications in accordance with aspects of the present disclosure. In some examples, the wireless communications system 200 may implement aspects of a wireless communications system 100. For example, the wireless communications system 200 may include a UE 115-a, a UE 115-b, and a base station 105-a which may be examples of a UE 115 and a base station 105 as described with reference to FIG. 1.

In some examples, the wireless communications system 200 may support sidelink communication. Sidelink communication may refer to communication between two or more UEs 115. An example of sidelink communication may be a UE 115-a communicating with a UE 115-b. UEs 115 capable of sidelink communication may allocate resources for sidelink transmissions using one of two modes (e.g., mode 1 or mode 2). In mode 1, resources used for sidelink transmissions are scheduled by the base station 105. For example, if the UE 115-a has pending data to transmit to the UE 115-b, the base station 105-a may transmit downlink control information (DCI) to the UE 115-a indicating a set of resources on which to transmit the data. Additionally, the UE 115-a may transmit sidelink control information (SCI) to the UE 115-b indicating the set of resource on which to receive the data message from the UE 115-a. In some examples, the sidelink scheduling scheme as described above may be applicable to half-duplex sidelink communication. When operating in half-duplex, a UE 115 may transmit on different time resources that are used to receive. However, UEs 115 may additionally be capable of full-duplex sidelink communication. When operating in full-duplex, a UE 115 may transmit and receive on the same or overlapping time resources. But some sidelink scheduling schemes may not allow for full-duplex sidelink communication.

As described herein, the base station 105 may schedule resources for full-duplex sidelink communication between UEs 115. In some examples, the UE 115-a and the UE 115-b may be capable of full-duplex communications and may have pending data to transmit to one another. To indicate the pending data to the base station 105-a, the UE 115-a and the UE 115-b may transmit a buffer status report (BSR) to the base station 105-a. Upon receiving the BSR from the UE 115-a and the UE 115-b, the base station 105-a may schedule the UE 115-a and the UE 115-b for full-duplex sidelink transmissions. In one example, the base station 105-a may transmit a sidelink grant 205-a to the UE 115-a, where the sidelink grant 205-a indicates a set of resources 210-a for transmitting a forward link sidelink transmission from the UE 115-a to the UE 115-b and a set of resources 210-b for transmitting a reverse link sidelink transmission from the UE 115-b to the UE 115-a. In some examples, the set of resources 210-a may at least partially overlap in time with the second set of resources 210-b. Upon receiving the sidelink grant 205-a, the UE 115-a may forward some or all of the information included in the sidelink grant 205-a to the UE 115-b in a sidelink grant 205-b. The sidelink grant 205-b may indicate at least the set of resources 210-a, the second set of resources 210-b or both. The sidelink grant 205-a may be included in DCI and the sidelink grant 205-b may be included in SCI. In some examples, the UE 115-b may be located outside of the coverage area 110-a and the base station 105-a may select the UE 115-a to receive the sidelink grant 205-a based on the UE 115-b being outside of the coverage area 110-a. In another example, the base station 105-a may select the UE 115-a to receive the sidelink grant 205-a because signal strength measurements (e.g., reference signal received power (RSRP) or signal-to-interference plus noise ratio (SINR)) associated with the UE 115-a are greater than signal strength measurements associated with the UE 115-b or because the UE 115-a has the capability to receive the sidelink grant 205-a from the base station 105-a and transmit the sidelink grant 205-b to the UE 115-b.

The UE 115-a may transmit a data message 215-a (forward link data) to the UE 115-b over the set of resources 210-a and the UE 115-b may transmit a data message 215-b (reverse link data) to the UE 115-a over the set of resources 210-b. Because the set of resources 210-a and the set of resources 210-b at least partially overlap in time, each of the UE 115-a and the UE 115-b may transmit and receive respective data messages 215 simultaneously. Once the respective data messages 215 are received at the UE 115-a and the UE 115-b, feedback information related to the data messages 215 may be transmitted to the base station 105-a. In some examples, the feedback information may include HARQ acknowledgement (ACK)/negative acknowledgement (NACK) feedback. HARQ ACK feedback may indicate that the data message 215 was decoded by the UE 115 successfully, whereas HARQ NACK feedback may indicate that the data message was not decoded successfully. In one example, the UE 115-b may generate feedback information related to the data message 215-a and transmit the feedback information to the UE 115-a. Similarly, the UE 115-a may generate feedback information related the data message 215-b, but may transmit its feedback information as well as the feedback information received from the UE 115-b to the base station 105-a. That is, the UE 115-b may forward the feedback information generated at the UE 115-b to the base station 105-a. In another example, the UE 115-a may generate feedback information related to the data message 215-b and the UE 115-b may generate feedback information related to the data message 215-a. The UE 115-a and the UE 115-b may then exchange the generated feedback information and separately transmit the feedback information to the base station 105-a. That is, the UE 115-a may transmit feedback information related to the data message 215-a to the base station 105-a and the UE 115-b may transmit feedback information related to the data message 215-b to the base station.

In another example, the base station 105 may transmit separate sidelink grants 205 to the UE 115 to enable full-duplex sidelink communication. That is, upon receiving BSRs from the UE 115-a and the UE 115-b, the base station 105-a may transmit a first sidelink grant (not shown in FIG. 2) to the UE 115-a and a second sidelink grant to the UE 115-b (not shown in FIG. 2), where the first sidelink grant indicates the set of resources 210-a for transmitting a forward link sidelink transmission from the UE 115-a to the UE 115-b and the second sidelink grant indicates the set of resources 210-b for transmitting a forward link sidelink transmission from the UE 115-b to the UE 115-a. In some examples, the set of resources 210-a may at least partially overlap in time with the second set of resources 210-b. Upon receiving the first sidelink grant, the UE 115-a may transmit SCI to the UE 115-b indicating the set of resources 210-a for receiving data from the UE 115-*b* and similarly, upon receiving the second sidelink grant, the UE 115-*b* may transmit SCI to the UE 115-*a* indicating the set of resources 210-*b* for receiving data from the UE 115-*b*. The first sidelink grant and the second sidelink may be included in DCI.

The UE 115-*a* may transmit a data message 215-*a* (forward link data) to the UE 115-*b* over the first set of resources 210-*a* and the UE 115-*b* may transmit a data message 215-*b* (forward link data) to the UE 115-*a* over the set of resources 210-*b*. Because the set of resources 210-*a* and the set of resources 210-*b* at least partially overlap in time, each of the UE 115-*a* and the UE 115-*b* may transmit and receive respective data messages 215 simultaneously. Once the respective data messages 215 are received at the UE 115-*a* and the UE 115-*b*, feedback information related to the data messages 215 may be transmitted to the base station. In some examples, the feedback information may include HARQ ACK/NACK feedback. HARQ ACK feedback may indicates that the data message 215 was decoded by the UE 115 successfully, whereas HARQ NACK feedback may indicate that the data message was not decoded successfully. In one example, the UE 115-*b* may generate feedback information related to the data message 215-*a* and transmit the feedback information to the UE 115-*a*. Similar, the UE 115-*a* may generate feedback information related the data message 215-*b*, but may transmit its feedback information as well as the feedback information received from the UE 115-*b* to the base station 105-*a*. That is the UE 115-*b* may forward the feedback information generated at the UE 115-*b* to the base station 105-*a*. In another example, the UE 115-*a* may generate feedback information related to the data message 215-*b* and the UE 115-*b* may generate feedback information related to the data message 215-*a*. The UE 115-*a* and the UE 115-*b* may then exchange the generated feedback information and separately transmit the feedback information to the base station 105-*a*. That is, the UE 115-*a* may transmit feedback information related to the data message 215-*a* to the base station 105-*a* and the UE 115-*b* may transmit feedback information related to the data message 215-*b* to the base station. The scheduling scheme as described herein may allow for UEs to operate in full-duplex for sidelink communications.

Figure 3:
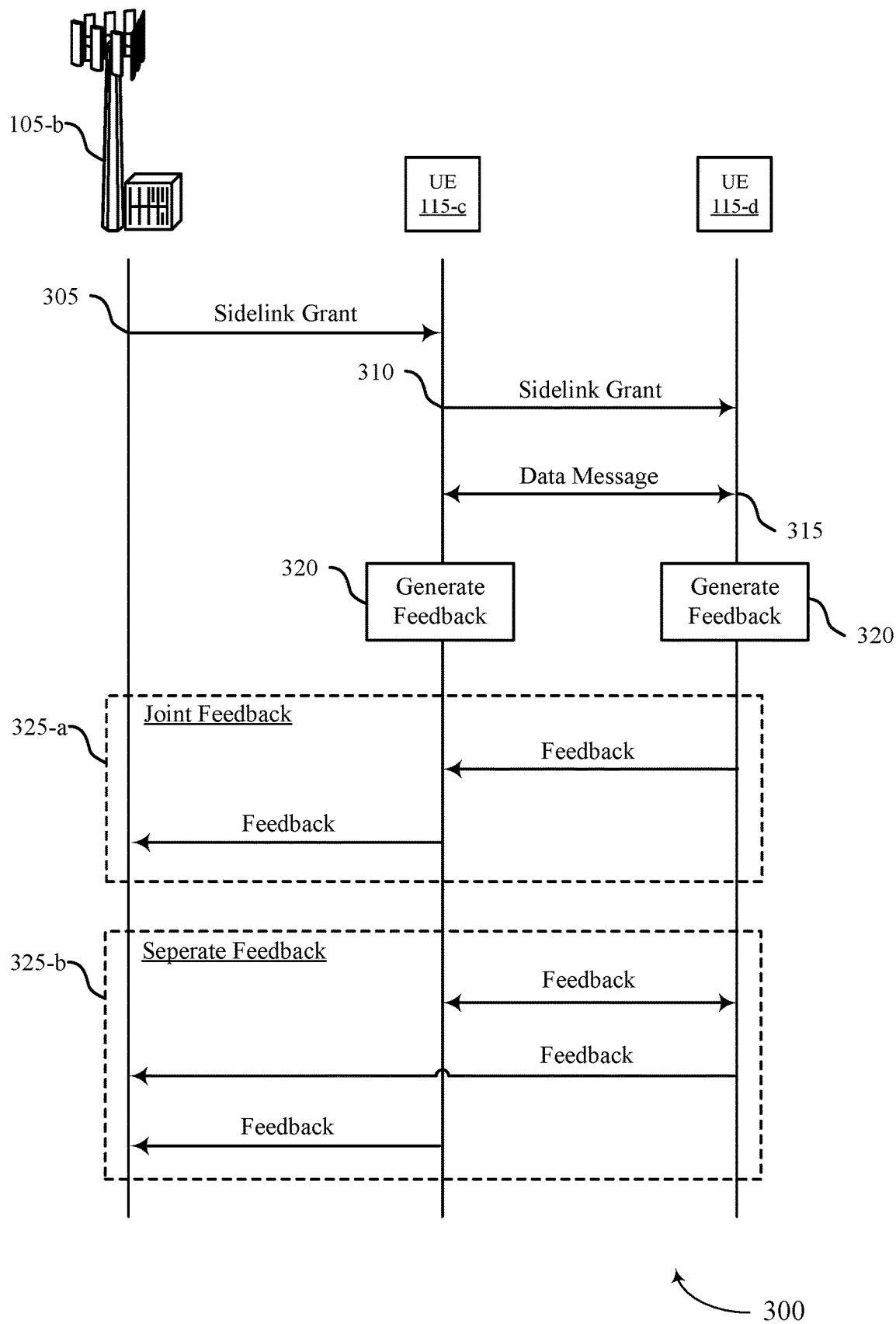
FIGS. 3 and 4 illustrate examples of a process flow that supports scheduling full-duplex sidelink communications in accordance with aspects of the present disclosure.

FIG. 3 illustrates an example of a process flow 300 that supports scheduling full-duplex sidelink communications in accordance with aspects of the present disclosure. In some examples, the process flow 300 may implement aspects of a wireless communications system 100 and a wireless communications system 200. For example, the process flow 300 may implement or be implemented by a UE 115-*c*, a UE 115-*d*, and a base station 105-*b* which may be examples of UEs 115 and a base station 105 as described with reference to FIGS. 1 and 2. In the following description of the process flow 300, the operations between the UE 115-*c*, the UE 115-*d*, and the base station 105-*b* may be performed in different orders or at different times. Some operations may also be left out of the process flow 300, or other operations may be added to the process flow 300. While the UE 115-*c*, the UE 115-*d*, and the base station 105-*b* are shown performing the operations of process flow 300, any wireless communication device may perform the operations shown.

In some examples, the UE 115-*c* and the UE 115-*d* may be capable of operating in full-duplex mode and may have pending data to transmit to one another. When operating in mode 1, the UE 115-*c* and the UE 115-*d* may request to be scheduled by the base station 105-*b* to transmit the pending data by transmitting BSRs to the base station 105-*b*. In some examples, the UE 115-*c* and the UE 115-*d* may transmit their respective BSR directly to the base station 105-*b*. Alternatively, the UE 115-*c* and the UE 115-*d* may transmit their respective BSR to another UE 115 (not shown in FIG. 3) and the other UE 115 may transmit the respective BSRs to the base station 105-*b*. As one example, the UE 115-*d* may transmit its BSR to the UE 115-*c* and the UE 115-*c* may forward the BSR from the UE 115-*d* along with its own BSR to the base station 105-*b*. In some examples, the UE 115-*c* and the UE 115-*d* may be located within a coverage area supported by the base station 105-*b*. Alternatively, one of the UE 115-*c* and the UE 115-*d* may be located outside of the coverage area supported by the base station 105-*b*. For example, the UE 115-*d* may be located outside the coverage area while the UE 115-*c* may be located within the coverage area.

At 305, the base station 105-*b* may transmit a first sidelink grant indicating a first set of resources and a second set of resources to the UE 115-*c*. In some examples, the base station 105-*b* may transmit the first sidelink grant at 305 based on the BSRs received from the UE 115-*c* and the UE 115-*d*. The first set of resources may be for transmitting forward link data from the UE 115-*c* to the UE 115-*d* and the second set of resources may be for transmitting reverse link data from the UE 115-*d* to the UE 115-*c*. In addition, the first set of resources may overlap the second set of resources at least partially in the time domain. In some cases, the base station 105-*b* may select a UE 115 to receive the sidelink grant based on a link quality between the UE 115 (e.g., the UE 115-*c* and the UE 115-*d*) and the base station 105-*b* (e.g., downlink transmission quality, uplink transmission quality, or both) or a capability of the UE 115.

The first sidelink grant transmitted to the UE 115-*c* at 305 may include a variety of sidelink parameters. For example, the first sidelink grant may include an indication of a format of a second sidelink grant transmitted from the UE 115-*c* to the UE 115-*d*, a timing difference between receiving the first sidelink grant and transmitting the second sidelink grant, or a radio network temporary identifier (RNTI) for the second sidelink grant. Additionally or alternatively, the first sidelink grant may include an indication of the UEs 115 receiving and transmitting sidelink grants (e.g., the second sidelink grant) for full-duplex sidelink communication. For example, the first sidelink grant may indicate a UE identifier (ID) associated with the UE 115-*c* and the UE 115-*d*.

Additionally or alternatively, the first sidelink grant may include scheduling information for the forward link data transmission (e.g., from the UE 115-*c* to the UE 115-*d*) and scheduling information for the reverse link data transmission (e.g., from the UE 115-*d* to the UE 115-*c*). That is, the first sidelink grant may include scheduling information for each full-duplex direction.

The scheduling information for the forward link data transmission may include one or more of a sidelink resource pool ID, a HARQ process ID, a new data indicator (NDI), a counter sidelink assignment index, sidelink time and frequency resource allocation, a sidelink demodulation reference signal (DMRS) pattern, a quantity of DMRS ports and corresponding DMRS port IDs, a transmit precoding matrix identifier (TPMI), beam IDs (e.g., transmission or reception beams for half-duplex communication (e.g., transmitting or receiving SCI) or transmission or reception beams for full-duplex communication (e.g., transmitting or receiving the forward link and reverse link data)), sidelink power control parameters (e.g., P0, alpha, pathloss reference signal, or closed-loop index), a sidelink modulation and coding scheme (MCS) ID, an MCS table ID, or a CC ID, a BWP ID, a semi-persistent scheduling (SPS) configuration ID, or a cell group (CG) configuration ID.

Similarly, the scheduling information for the reverse link data transmission may include one or more of a sidelink resource pool ID, a HARQ process ID, a NDI, a counter sidelink assignment index, sidelink time and frequency resource allocation, a sidelink DMRS pattern, a quantity of DMRS ports and corresponding DMRS port IDs, a TPMI, beam IDs (e.g., transmission or reception beams for half-duplex communication (e.g., transmitting or receiving SCI) or transmission or reception beams for full-duplex communication (e.g., transmitting or receiving the forward link and reverse link data)), sidelink power control parameters (e.g., P0, alpha, pathloss reference signal, or closed-loop index), a sidelink MCS ID, an MCS table ID, or a CC ID, a BWP ID, a SPS configuration ID, or a CG configuration ID. In some examples, the first sidelink grant may be included in DCI.

At 310, the UE 115-c may transmit the second sidelink grant to the UE 115-d. In some examples, the second sidelink may include at least some of the information included in the first sidelink grant. For example, the second sidelink grant may include an indication of the second set of resources. Additionally, the second sidelink grant may include scheduling information for the forward link data transmission and scheduling information for the reverse link data transmission. In some examples, the second sidelink grant may be included in SCI, where the SCI may be sent in stages (e.g., a first stage SCI and a second stage SCI) or as a single SCI. The first stage SCI for the forward link data transmission may include an indication of a sidelink priority, a sidelink time and frequency resource allocation, a DMRS pattern, a quantity of DMRS ports and corresponding DMRS port IDs, an MCS ID, a MCS table ID, a physical sidelink feedback channel (PSFCH) format, a sidelink format for the second stage SCI (e.g., and a corresponding beta_offset value), or beam IDs (e.g., reception beams for the second stage SCI or data). The second stage SCI for the forward link data transmission may include an indication of a HARQ process indicator, an NDI, an RV index, source and destination ID, a HARQ feedback enabled indicator, a cast type indicator, a channel state information (CSI) request indicator, a zone ID, or a communication range. If the second sidelink grant is sent as part a single SCI, the single SCI for the forward link data transmission may include the contents collectively described as included in the first stage SCI and second stage SCI.

Similarly, the first stage SCI for the reverse link data transmission may include an indication of a sidelink priority, a sidelink time and frequency resource allocation, a DMRS pattern, a quantity of DMRS ports and corresponding DMRS port IDs, an MCS ID, a MCS table ID, a PSFCH format, a sidelink format for the second stage SCI (and a corresponding beta_offset value), or beam IDs (e.g., transmission beams for the second stage SCI or data and corresponding PC/TPMI parameters). The second stage SCI for the reverse link data transmission may include an indication of a HARQ process ID, an NDI, a redundant version (RV) index, the UE 115-c (e.g., source ID), the UE 115-d (e.g., destination ID), a cast type indicator, a zone ID, communication range, or a CSI request indicator. If the second sidelink grant is sent as part a single SCI, the single SCI for the reverse link data transmission may include the contents collectively described as included in the first stage SCI and second stage SCI.

At 315, the UE 115-c may transmit a first data message (e.g., forward link data) over the first set of resources to the UE 115-d and the UE 115-d may transmit a second data message (e.g., reverse link data) over the second set of resource to the UE 115-c.

At 320, the UE 115-c may generate feedback information associated with the second data message from the UE 115-d at 315 and the UE 115-d may generate feedback information associated with the first data message received from the UE 115-c at 315. The feedback information may be in the form of HARQ ACK/NACK feedback and may be sent over resources of the PSFCH.

In some examples, the UE 115-c and the UE 115-d may convey the feedback information generated at 320 to the base station 105-b using joint feedback procedures. For example, at 325-a, the UE 115-d may transmit feedback information related to the first data message to the UE 115-c. The UE 115-c may then transmit the feedback information related to the second message generated at 320 along with the feedback information received from the UE 115-d to the base station 105-b. Because the UE 115-d does not receive feedback information from the UE 115-c the second sidelink grant received at 310 may not include one or more parameters related to the HARQ feedback. For example, the first stage SCI for the reverse link data transmission may not include the PSFCH format. Additionally, the second stage SCI for the reverse data transmission may not include the cast type indicator, the zone ID, and the communication range.

As described above, the UE 115-d may be outside of the coverage area supported by the base station 105-b. In such case, the base station 105-b may specify a physical uplink control channel (PUCCH) resource ID, a PSFCH format, a PSFCH-to-HARQ feedback timing indicator in the first sidelink grant for only the UE 115-c. In some examples, the UE 115 transmitting the joint feedback may different from the UE 115-c. That is, the UE 115-c may transmit the feedback information related to the second data message to another UE 115 and the UE 115-d may transmit the feedback information to the other UE 115. The other UE 115 may then transmit the joint feedback to the base station 105-b.

Alternatively, the UE 115-c and the UE 115-d may convey the feedback information generated at 320 to the base station 105-b using separate feedback procedures. For example, at 325-b, the UE 115-c and the UE 115-d exchange the feedback information generated at 320. That is, the UE 115-d may transmit feedback information related to the first data message to the UE 115-c and the UE 115-c may transmit the feedback information related to the second data message to the UE 115-d. The UEs 115 may exchange feedback information in half-duplex or full-duplex manner. The UE 115-c and the UE 115-d may then report the feedback information separately to the base station 105-b. For example, the UE 115-c may transmit the feedback information associated with the first data message to the base station 105-b over resources of the PUCCH and the UE 115-d may transmit the feedback information for the second data message to the base station 105-b over resources of the PUCCH.

As described above, both the UE 115-c and the UE 115-c may be inside of the coverage area supported by the base station 105-b. In such case, the base station 105-b may specify the PUCCH resource ID, the PSFCH format, a PSFCH-to-HARQ feedback timing indicator in the first sidelink grant for each of the UE 115-c and the UE 115-d.

Figure 4:
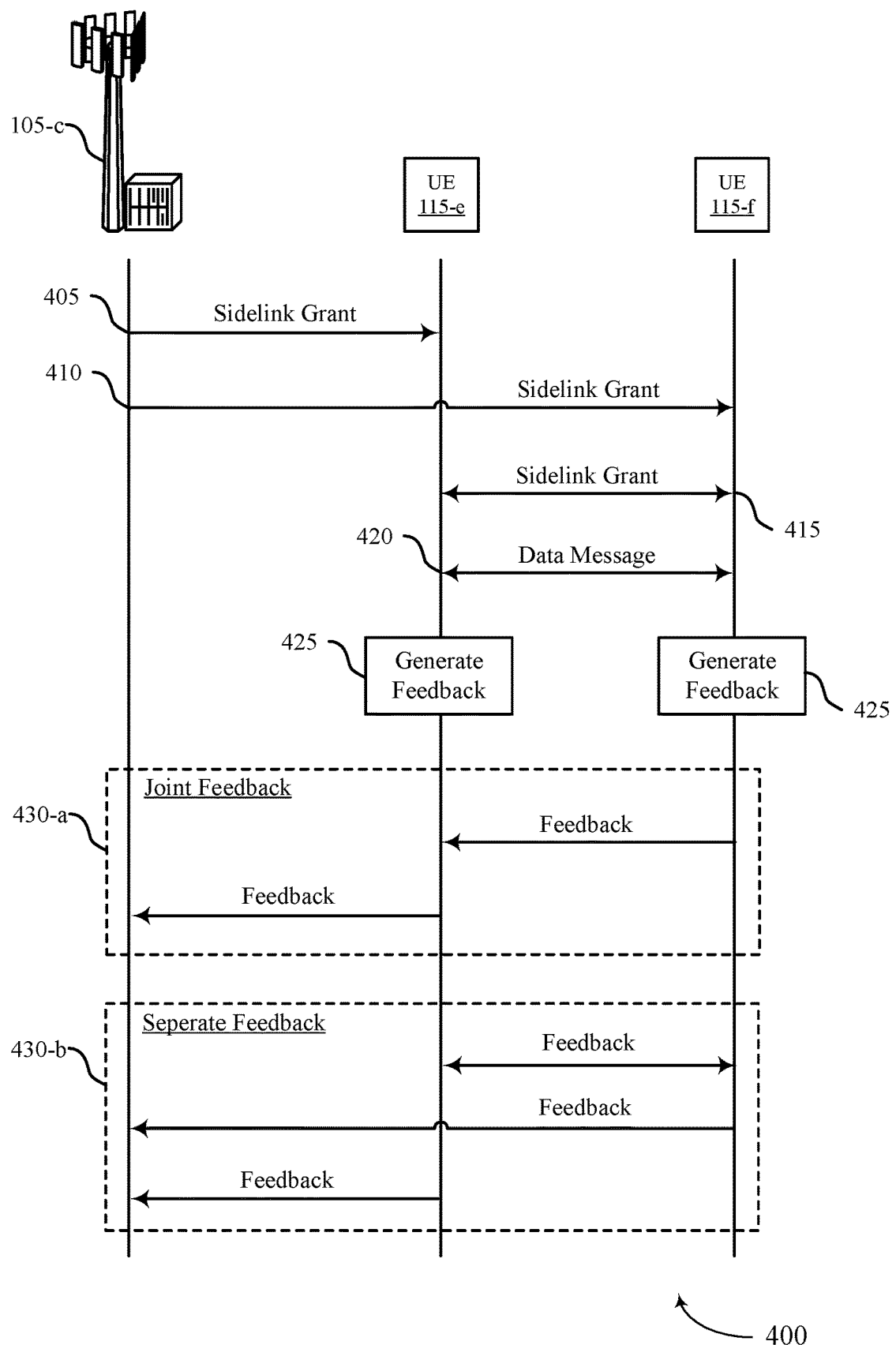

FIG. 4 illustrates an example of a process flow 400 that supports scheduling full-duplex sidelink communications in accordance with aspects of the present disclosure. In some examples, the process flow 400 may implement aspects of a wireless communications system 100 and a wireless communications system 200. For example, the process flow 400 may implement or be implemented by a UE 115-*e*, a UE 115-*f*, and a base station 105-*c* which may be examples of UEs 115 and a base station 105 as described with reference to FIGS. 1 and 2. In the following description of the process flow 300, the operations between the UE 115-*e*, the UE 115-*f*, and the base station 105-*c* may be performed in different orders or at different times. Some operations may also be left out of the process flow 400, or other operations may be added to the process flow 400. While the UE 115-*e*, the UE 115-*f*, and the base station 105-*c* are shown performing the operations of process flow 300, any wireless communication device may perform the operations shown.

In some examples, the UE 115-*e* and the UE 115-*f* may be capable of operating in full-duplex mode and may have pending data to transmit to one another. When operating in mode 1, the UE 115-*e* and the UE 115-*f* may request to be scheduled by the base station 105-*c* to transmit the pending data by transmitting BSRs to the base station 105-*c*. In some examples, the UE 115-*e* and the UE 115-*f* may transmit their respective BSR directly to the base station 105-*c*. Alternatively, the UE 115-*e* and the UE 115-*f* may transmit their respective BSRs to another UE 115 and the other UE 115 may transmit the respective BSRs to the base station 105-*c*. As one example, the UE 115-*f* may transmit its BSR to the UE 115-*e* and the UE 115-*e* may forward the BSR from the UE 115-*f* as well as its own BSR to the base station 105-*c*. In some examples, the UE 115-*e* and the UE 115-*f* may be located within a coverage area supported by the base station 105-*c*. In another example, one of the UE 115-*e* and the UE 115-*f* may be located outside of the coverage area supported by the base station 105-*c*. For example, the UE 115-*f* may be located outside the coverage area while the UE 115-*e* may be located within the coverage area.

At 405, the base station 105-*c* may transmit a first sidelink grant indicating a first set of resources to the UE 115-*e*. In some examples, the base station 105-*c* may transmit the sidelink grant at 405 based on the BSR received from the UE 115-*e*. The first set of resources may be for transmitting forward link data from the UE 115-*e* to the UE 115-*f*. Additionally, at 410, the base station 105-*c* may transmit a second sidelink grant indicating a second set of resources to the UE 115-*f*. In some examples, the base station 105-*c* may transmit the sidelink grant at 410 based on the BSR received from the UE 115-*f*. The second set of resources may be for transmitting forward link data from the UE 115-*f* to the UE 115-*e*. The first set of resources may overlap the second set of resources at least partially in the time domain.

The first sidelink grant and the second sidelink grant may include a variety of sidelink parameters. For example, the first sidelink grant and the second sidelink grant may include an indication of an SCI format, a timing difference between receiving the first sidelink grant or the second sidelink grant and transmitting the SCI, or a RNTI for SCI. Additionally or alternatively, the first sidelink grant and the second sidelink grant may include an indication of the UEs 115 receiving and transmitting SCI for full-duplex sidelink scheduling. For example, the first sidelink grant and the second sidelink grant may indicate a UE ID associated with the UE 115-*e* and the UE 115-*f*.

Additionally or alternatively, the first sidelink grant may include scheduling information for the forward link data transmission from the UE 115-*e* to the UE 115-*f* and the second sidelink grant may include scheduling information for the forward link transmission from the UE 115-*f* to the UE 115-*e*. The scheduling information for the forward link information from the UE 115-*e* to the UE 115-*f* and the scheduling information for the forward link transmission from the UE 115-*f* to the UE 115-*e* may include one or more of a sidelink resource pool ID, a HARQ process ID, a NDI, a counter sidelink assignment index, sidelink time and frequency resource allocation, a sidelink DMRS pattern, a quantity of DMRS ports and corresponding DMRS port IDs, a TPMI, beam IDs (e.g., transmission or reception beams for half-duplex communication (e.g., transmitting or receiving SCI)) or transmission or reception beams for full-duplex communication (e.g., transmitting or receiving the forward link data)), sidelink power control parameters (e.g., P0, alpha, pathloss reference signal, or closed-loop index), a sidelink MCS ID, an MCS table ID, or a CC ID, a BWP ID, a SPS configuration ID, or a CG, configuration ID.

At 415, the UE 115-*e* and the UE 115-*f* may exchange SCI. In some examples, the UE 115-*e* may transmit SCI to the UE 115-*e* based on the first sidelink grant received at 405 and in some examples, the SCI may include information related to the forward link data transmission from the UE 115-*e* to the UE 115-*f* (e.g., an indication of the first set of resources). Similarly, the UE 115-*f* may transmit SCI to the UE 115-*e* based on the second sidelink grant received at 410 and in some examples, the SCI may include information related to the forward link data transmission from the UE 115-*f* to the UE 115-*e* (e.g., an indication of the second set of resources). In some examples, the SCI may be sent in stages (e.g., a first stage SCI and a second stage SCI) or as a single SCI. The first stage SCI sent from the UE 115-*e* to the UE 115-*f* and the first stage SCI sent from the UE 115-*f* to the UE 115-*e* may include an indication of a sidelink priority, a sidelink time and frequency resource allocation, a DMRS pattern, a quantity of DMRS ports and corresponding DMRS port IDs, an MCS ID, a MCS table ID, a PSFCH format, a sidelink format for the second stage SCI (e.g., and a corresponding beta_offset value), or beam IDs (e.g., reception beams for the second stage SCI or data).

The second stage SCI sent from the UE 115-*e* to the UE 115-*f* and the second stage SCI sent from the UE 115-*f* to the UE 115-*e* may include an indication of a HARQ process indicator, an NDI, an RV index, source and destination ID, a HARQ feedback enabled indicator, a cast type indicator, a CSI request indicator, a zone ID, or a communication range. If the second sidelink grant is sent as part a single SCI, the single SCI for the forward link data transmission may include the contents collectively described as included in the first stage SCI and second stage SCI.

At 420, the UE 115-*e* may transmit a first data message (e.g., forward link data) over the first set of resources to the UE 115-*f* and the UE 115-*f* may transmit a second data message (e.g., forward link data) over the second set of resource to the UE 115-*e*.

At 425, the UE 115-*e* may generate feedback information associated with the second data message from the UE 115-*f* at 420 and the UE 115-*f* may generate feedback information associated with the first data message received from the UE 115-*e* at 420. The feedback information may be in the form of HARQ ACK/NACK feedback and may be sent over resources of the PUCCH or the PSFCH.

In some examples, the UE 115-*e* and the UE 115-*f* may convey the feedback information generated at 425 to the base station 105-*c* using joint feedback procedures. For example, at 430-*a*, the UE 115-*f* may transmit feedback information related to the first data message to the UE 115-*e*. The UE 115-*e* may then transmit the feedback information related to the second message generated at 425 along with the feedback information received from the UE 115-*f* to the base station 105-c. Because the UE 115-f does not receive feedback information from the UE 115-e, the SCI transmitted from the UE 115-f to the UE 115-e may not include one or more parameters related to the HARQ feedback. For example, the first stage SCI transmitted from the UE 115-f to the UE 115-e may not include the PSFCH format. Additionally, the second stage SCI transmitted from the UE 115-f to the UE 115-e may not include the cast type indicator, the zone ID, and the communication range.

As described above, the UE 115-f may be outside of the coverage area supported by the base station 105-c. In such case, the base station 105-c may specify the PUCCH resource ID, the PSFCH format, a PSFCH-to-HARQ feedback timing indicator in the first sidelink grant for only the UE 115-e. In some examples, the UE 115 transmitting the joint feedback may different from the UE 115-e. That is, the UE 115-e may transmit the feedback information related to the second data message to another UE 115 and the UE 115-f may transmit the feedback information to the other UE 115. The other UE 115 may then transmit the joint feedback to the base station 105-c.

Alternatively, the UE 115-e and the UE 115-f may convey the feedback information generated at 425 to the base station 105-c using separate feedback procedures. For example, at 430-b, the UE 115-e and the UE 115-f may exchange the feedback information generated at 425. That is, the UE 115-f may transmit feedback information related to the first data message to the UE 115-e and the UE 115-e may transmit the feedback information related to the second data message to the UE 115-f. The UEs 115 may exchange feedback information in half-duplex or full-duplex manner. The UE 115-e and the UE 115-f may then report the feedback information separately to the base station 105-c. For example, the UE 115-e may transmit the feedback information associated with the first data message to the base station 105-c and the UE 115-f may transmit the feedback information for the second data message to the base station 105-c.

As described above, both the UE 115-e and the UE 115-f may be inside of the coverage area supported by the base station 105-c. In such case, the base station 105-c may specify the PUCCH resource ID, the PSFCH format, a PSFCH-to-HARQ feedback timing indicator in the first sidelink grant for each of the UE 115-e and the UE 115-f.

Figure 5:
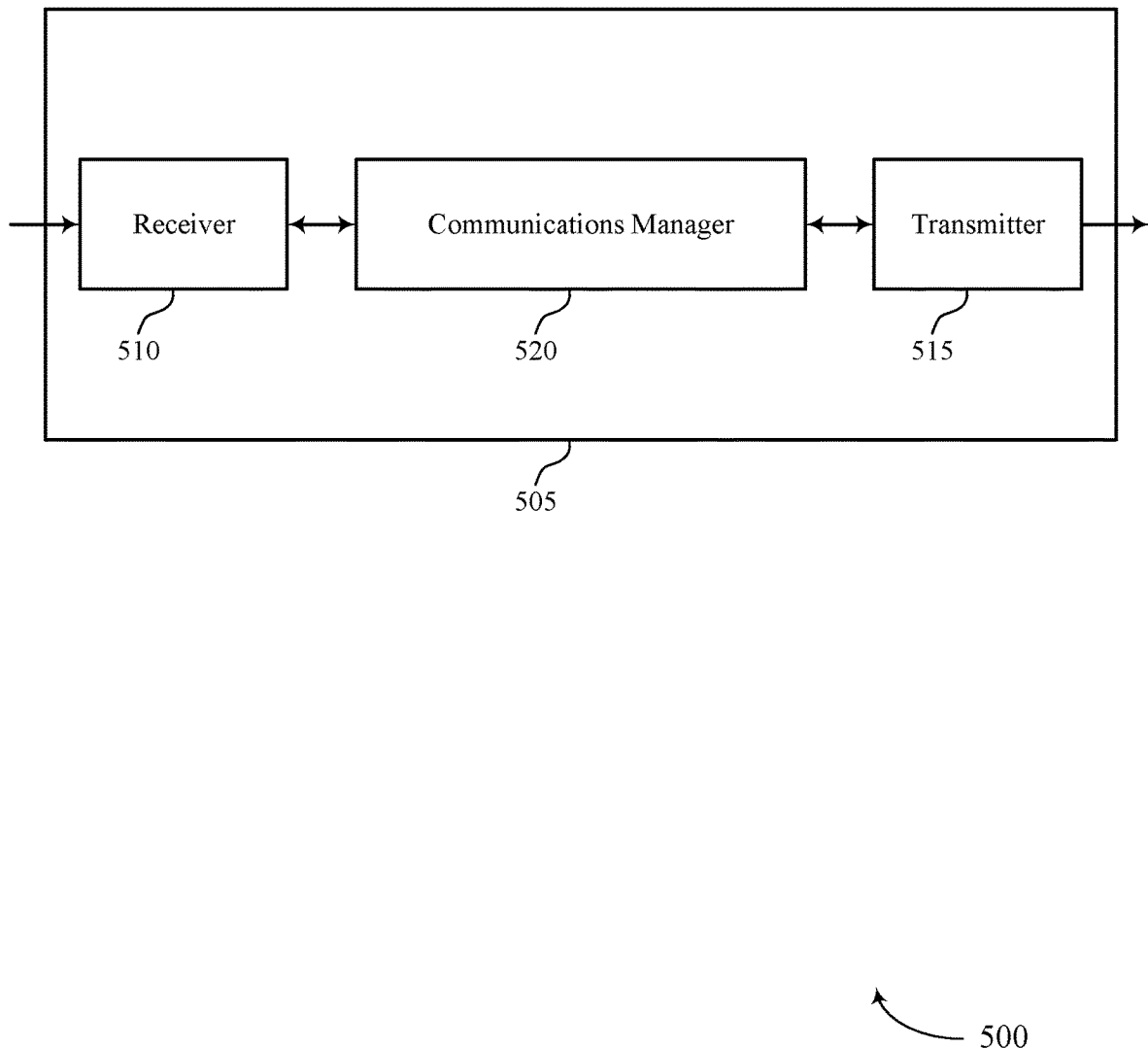
FIGS. 5 and 6 show block diagrams of devices that support scheduling full-duplex sidelink communications in accordance with aspects of the present disclosure.

FIG. 5 shows a block diagram 500 of a device 505 that supports scheduling full-duplex sidelink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to scheduling full-duplex sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to scheduling full-duplex sidelink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of scheduling full-duplex sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. For example, the communications manager 520 may be configured as or otherwise support a means for receiving, from a base station, a first sidelink grant indicating a first set of resources and a second set of resources, where the first set of resources at least partially overlaps in time with the second set of resources. The communications manager 520 may be configured as or otherwise support a means for transmitting, to a second wireless device, a second sidelink grant indicating the second set of resources. The communications manager 520 may be configured as or otherwise support a means for transmitting, to the second wireless device, a first data message over the first set of resources based on the first sidelink grant, the second sidelink grant, or both. The communications manager 520 may be configured as or otherwise support a means for receiving, from the second wireless device, a second data message over the second set of resources based on the first sidelink grant, the second sidelink grant, or both.

Additionally or alternatively, the communications manager 520 may support wireless communication at a second wireless device in accordance with examples as disclosed herein. For example, the communications manager 520 may be configured as or otherwise support a means for receiving, from a first wireless device, a sidelink grant indicating a first set of resources for a first data message and a second set of resources for a second data message, where the first set of resources at least partially overlaps in time with the second set of resources. The communications manager 520 may be configured as or otherwise support a means for receiving, from the first wireless device, the first data message over the first set of resources based on the sidelink grant. The communications manager 520 may be configured as or otherwise support a means for transmitting, to the first wireless device, the second data message over the second set of resources based on the sidelink grant.

Additionally or alternatively, the communications manager 520 may support wireless communication at a first wireless device in accordance with examples as disclosed herein. For example, the communications manager 520 may be configured as or otherwise support a means for receiving, from a base station, a first sidelink grant indicating a first set of resources. The communications manager 520 may be configured as or otherwise support a means for transmitting, to a second wireless device, a second sidelink grant indicating at least the first set of resources. The communications manager 520 may be configured as or otherwise support a means for transmitting, to the second wireless device, a first data message over the first set of resources based on the first sidelink grant, the second sidelink grant, or both. The communications manager 520 may be configured as or otherwise support a means for receiving, from the second wireless device, a second data message over a second set of resources, where the second set of resources at least partially overlaps in time with the first set of resources. The communications manager 520 may be configured as or otherwise support a means for receiving, from the second wireless device, feedback information related to the first data message. The communications manager 520 may be configured as or otherwise support a means for transmitting, to the base station, the feedback information related to the first data message.

Additionally or alternatively, the communications manager 520 may support wireless communication at a second wireless device in accordance with examples as disclosed herein. For example, the communications manager 520 may be configured as or otherwise support a means for receiving, from a base station, a first sidelink grant indicating a first set of resources. The communications manager 520 may be configured as or otherwise support a means for transmitting, to a first wireless device, a second sidelink grant indicating at least the first set of resources. The communications manager 520 may be configured as or otherwise support a means for transmitting, to the first wireless device, a first data message over the first set of resources based on the first sidelink grant, the second sidelink grant, or both. The communications manager 520 may be configured as or otherwise support a means for receiving, from the first wireless device, a second data message over a second set of resources, where the second set of resources at least partially overlaps in time with the first set of resources. The communications manager 520 may be configured as or otherwise support a means for transmitting, to one of the base station or the first UE, feedback information related to the second data message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources. The methods as described herein may enable full-duplex communication between devices 505. While operating in full-duplex, a device 505 may transmit and receive over the same time resources. Using the same time resources to transmit and receive may be more efficient then using different time resources to transmit and receive such as when the device 505 is in half-duplex.

Figure 6:
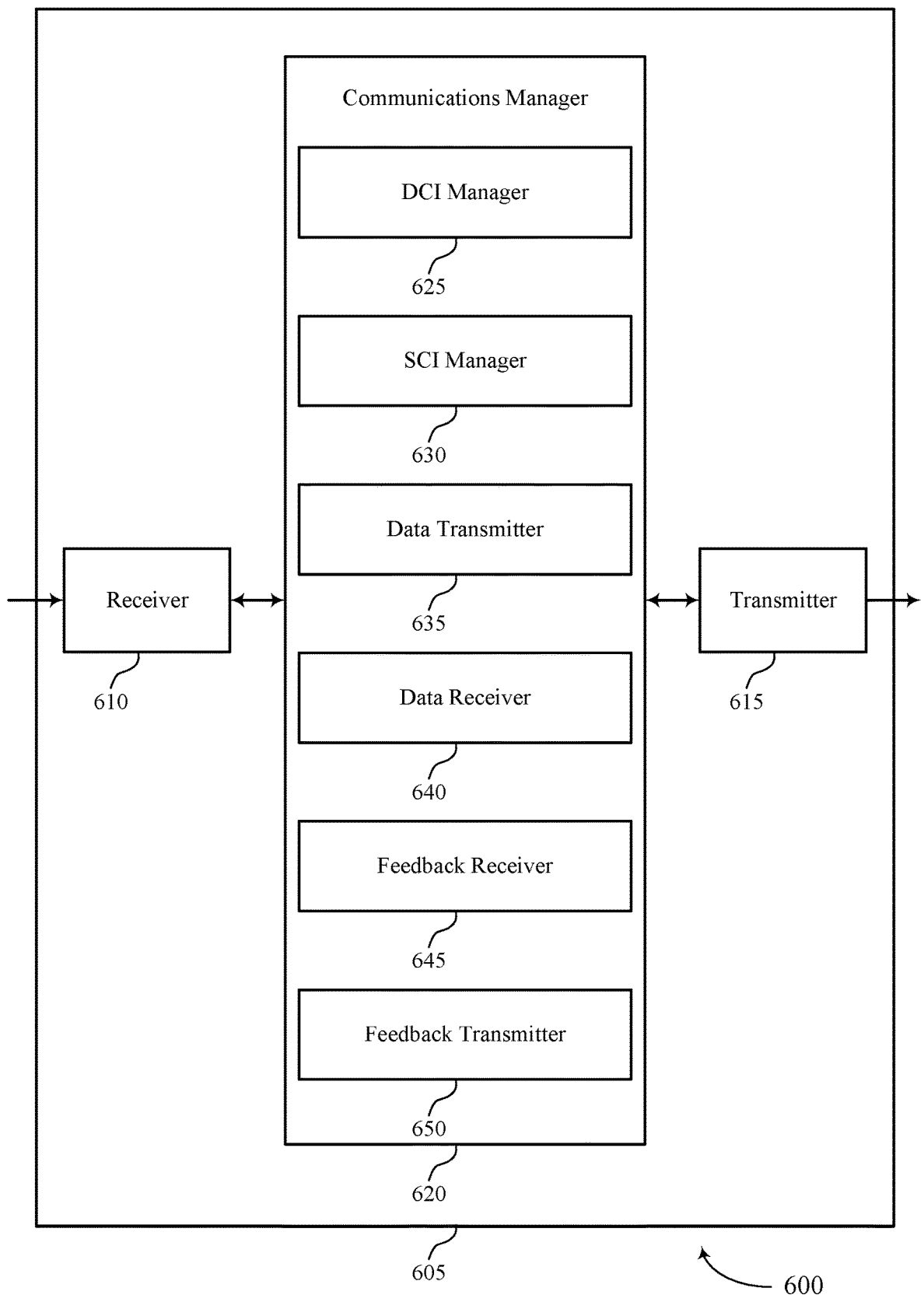

FIG. 6 shows a block diagram 600 of a device 605 that supports scheduling full-duplex sidelink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to scheduling full-duplex sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to scheduling full-duplex sidelink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of scheduling full-duplex sidelink communications as described herein. For example, the communications manager 620 may include a DCI manager 625, an SCI manager 630, a data transmitter 635, a data receiver 640, a feedback receiver 645, a feedback transmitter 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The DCI manager 625 may be configured as or otherwise support a means for receiving, from a base station, a first sidelink grant indicating a first set of resources and a second set of resources, where the first set of resources at least partially overlaps in time with the second set of resources. The SCI manager 630 may be configured as or otherwise support a means for transmitting, to a second wireless device, a second sidelink grant indicating the second set of resources. The data transmitter 635 may be configured as or otherwise support a means for transmitting, to the second wireless device, a first data message over the first set of resources based on the first sidelink grant, the second sidelink grant, or both. The data receiver 640 may be configured as or otherwise support a means for receiving, from the second wireless device, a second data message over the second set of resources based on the first sidelink grant, the second sidelink grant, or both.

Additionally or alternatively, the communications manager 620 may support wireless communication at a second wireless device in accordance with examples as disclosed herein. The SCI manager 630 may be configured as or otherwise support a means for receiving, from a first wireless device, a sidelink grant indicating a first set of resources for a first data message and a second set of resources for a second data message, where the first set of resources at least partially overlaps in time with the second set of resources. The data receiver 640 may be configured as or otherwise support a means for receiving, from the first wireless device, the first data message over the first set of resources based on the sidelink grant. The data transmitter 635 may be configured as or otherwise support a means for transmitting, to the first wireless device, the second data message over the second set of resources based on the sidelink grant.

Additionally or alternatively, the communications manager 620 may support wireless communication at a first wireless device in accordance with examples as disclosed herein. The DCI manager 625 may be configured as or otherwise support a means for receiving, from a base station, a first sidelink grant indicating a first set of resources. The SCI manager 630 may be configured as or otherwise support a means for transmitting, to a second wireless device, a second sidelink grant indicating at least the first set of resources. The data transmitter 635 may be configured as or otherwise support a means for transmitting, to the second wireless device, a first data message over the first set of resources based on the first sidelink grant, the second sidelink grant, or both. The data receiver 640 may be configured as or otherwise support a means for receiving, from the second wireless device, a second data message over a second set of resources, where the second set of resources at least partially overlaps in time with the first set of resources. The feedback receiver 645 may be configured as or otherwise support a means for receiving, from the second wireless device, feedback information related to the first data message. The feedback transmitter 650 may be configured as or otherwise support a means for transmitting, to the base station, the feedback information related to the first data message.

Additionally or alternatively, the communications manager 620 may support wireless communication at a second wireless device in accordance with examples as disclosed herein. The DCI manager 625 may be configured as or otherwise support a means for receiving, from a base station, a first sidelink grant indicating a first set of resources. The SCI manager 630 may be configured as or otherwise support a means for transmitting, to a first wireless device, a second sidelink grant indicating at least the first set of resources. The data transmitter 635 may be configured as or otherwise support a means for transmitting, to the first wireless device, a first data message over the first set of resources based on the first sidelink grant, the second sidelink grant, or both. The data receiver 640 may be configured as or otherwise support a means for receiving, from the first wireless device, a second data message over a second set of resources, where the second set of resources at least partially overlaps in time with the first set of resources. The feedback transmitter 650 may be configured as or otherwise support a means for transmitting, to one of the base station or the first UE, feedback information related to the second data message.

Figure 7:
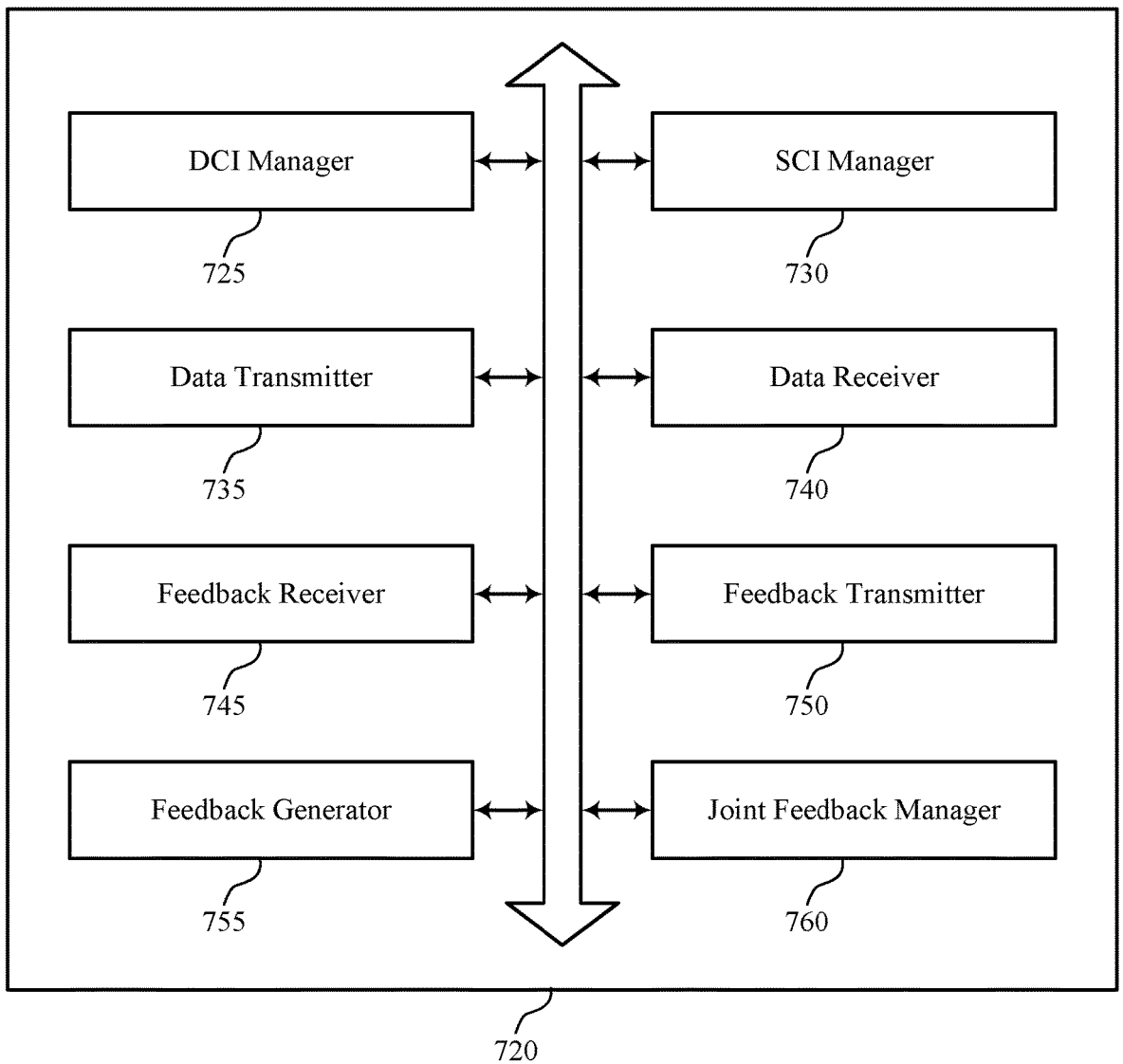
FIG. 7 shows a block diagram of a communications manager that supports scheduling full-duplex sidelink communications in accordance with aspects of the present disclosure.

FIG. 7 shows a block diagram 700 of a communications manager 720 that supports scheduling full-duplex sidelink communications in accordance with aspects of the present disclosure. The communications manager 720 may be an example of aspects of a communications manager 520, a communications manager 620, or both, as described herein. The communications manager 720, or various components thereof, may be an example of means for performing various aspects of scheduling full-duplex sidelink communications as described herein. For example, the communications manager 720 may include a DCI manager 725, an SCI manager 730, a data transmitter 735, a data receiver 740, a feedback receiver 745, a feedback transmitter 750, a feedback generator 755, a joint feedback manager 760, or any combination thereof. Each of these components may communicate, directly or indirectly, with one another (e.g., via one or more buses).

The communications manager 720 may support wireless communication at a first wireless device in accordance with examples as disclosed herein. The DCI manager 725 may be configured as or otherwise support a means for receiving, from a base station, a first sidelink grant indicating a first set of resources and a second set of resources, where the first set of resources at least partially overlaps in time with the second set of resources. The SCI manager 730 may be configured as or otherwise support a means for transmitting, to a second wireless device, a second sidelink grant indicating the second set of resources. The data transmitter 735 may be configured as or otherwise support a means for transmitting, to the second wireless device, a first data message over the first set of resources based on the first sidelink grant, the second sidelink grant, or both. The data receiver 740 may be configured as or otherwise support a means for receiving, from the second wireless device, a second data message over the second set of resources based on the first sidelink grant, the second sidelink grant, or both.

In some examples, the feedback generator 755 may be configured as or otherwise support a means for generating, at the first wireless device, feedback information related to the second data message. In some examples, the feedback receiver 745 may be configured as or otherwise support a means for receiving, from the second wireless device, feedback information related to the first data message. In some examples, the joint feedback manager 760 may be configured as or otherwise support a means for transmitting, to the base station, the feedback information related to the first data message and the feedback information related to the second data message based on the first sidelink grant.

In some examples, the feedback generator 755 may be configured as or otherwise support a means for generating, at the first wireless device, feedback information related to the second data message. In some examples, the feedback transmitter 750 may be configured as or otherwise support a means for transmitting, to the second wireless device, the feedback information related to the second data message. In some examples, the feedback receiver 745 may be configured as or otherwise support a means for receiving, from the second wireless device, feedback information related to the first data message. In some examples, the feedback transmitter 750 may be configured as or otherwise support a means for transmitting, to the base station, the feedback information related to the first data message.

In some examples, the first sidelink grant indicates a format of the second sidelink grant, a time gap between reception of the first sidelink grant and transmission of the second sidelink grant, a RNTI for inclusion in the second sidelink grant, a UE ID associated with a wireless device transmitting the second sidelink grant, a UE ID associated with a wireless device receiving the second sidelink grant, or any combination thereof.

In some examples, the first sidelink grant includes scheduling information for the first data message and scheduling information for the second data message.

In some examples, at least one of the scheduling information for the first data message and the scheduling information for the second data message includes a sidelink resource pool ID, a HARQ process ID, a NDI, a counter sidelink assignment index, a sidelink time and frequency resource allocation, a sidelink DMRS pattern, a quantity of sidelink DMRS ports and corresponding sidelink DMRS port IDs, a TPMI, a transmit beam ID or a receive beam ID for half-duplex communication between the first wireless device and the second wireless device, a transmit beam ID or a receive beam ID for full-duplex communication between the first wireless device and the second wireless device, a sidelink power control parameter, a MCS ID, a MCS table ID, a CC ID, a BWP ID, a SPS configuration ID, a CG configuration ID, or any combination thereof.

In some examples, the second sidelink grant includes scheduling information for the first data message and scheduling information for the second data message.

In some examples, at least one of the scheduling information for the first data message and the scheduling information for the second data message includes a sidelink priority, a sidelink time and frequency resource allocation, a sidelink DMRS pattern, a quantity of sidelink DMRS ports and corresponding sidelink DMRS port IDs, a MCS ID, a MCS table ID, a format for a PSFCH, a format of a second stage SCI and corresponding offset value, a beam ID for receiving or transmitting the second stage SCI, the first data message or the second data message, a precoding matrix ID, a TPMI, or any combination thereof.

In some examples, at least one of the scheduling information for the first data message and the scheduling information for the second data message includes a HARQ process ID, NDI, an RV index, an ID associated with the first wireless device or the second wireless device, an indication that HARQ feedback is enabled, a cast type indicator, CSI request indicator, a zone ID, an indication of a communications range, or any combination thereof.

In some examples, the second sidelink grant includes a reverse link grant corresponding to the second data message and a forward link grant corresponding to the first data message, the reverse link grant and the forward link grant indicating different sets of parameters.

In some examples, the first data message corresponds to a forward link transmission and the second data message corresponds to a reverse link transmission.

In some examples, the second sidelink grant includes first stage SCI and second stage SCI.

In some examples, receiving the first sidelink grant is based on a capability of the first wireless device, a link quality between the first wireless device and the base station, or any combination thereof.

Additionally or alternatively, the communications manager 720 may support wireless communication at a second wireless device in accordance with examples as disclosed herein. In some examples, the SCI manager 730 may be configured as or otherwise support a means for receiving, from a first wireless device, a sidelink grant indicating a first set of resources for a first data message and a second set of resources for a second data message, where the first set of resources at least partially overlaps in time with the second set of resources. In some examples, the data receiver 740 may be configured as or otherwise support a means for receiving, from the first wireless device, the first data message over the first set of resources based on the sidelink grant. In some examples, the data transmitter 735 may be configured as or otherwise support a means for transmitting, to the first wireless device, the second data message over the second set of resources based on the sidelink grant.

In some examples, the feedback generator 755 may be configured as or otherwise support a means for generating, at the second wireless device, feedback information related to the first data message. In some examples, the feedback transmitter 750 may be configured as or otherwise support a means for transmitting, to the first wireless device, the feedback information related to the first data message.

In some examples, the feedback generator 755 may be configured as or otherwise support a means for generating, at the second wireless device, feedback information related to the first data message. In some examples, the feedback transmitter 750 may be configured as or otherwise support a means for transmitting, to the first wireless device, the feedback information related to the first data message. In some examples, the feedback receiver 745 may be configured as or otherwise support a means for receiving, from the first wireless device, feedback information related to the second data message. In some examples, the feedback transmitter 750 may be configured as or otherwise support a means for transmitting, to a base station, the feedback information related to the second data message.

In some examples, the sidelink grant includes scheduling information for the first data message and scheduling information for the second data message.

In some examples, at least one of the scheduling information for the first data message and the scheduling information for the second data message includes a sidelink priority, a sidelink time and frequency resource allocation, a sidelink DMRS pattern, a quantity of sidelink DMRS ports and corresponding sidelink DMRS port IDs, a MCS ID, a MCS table ID, a format for a PSFCH, a format of a second stage SCI and corresponding offset value, a beam ID for receiving or transmitting the second stage SCI, the first data message or the second data message, a precoding matrix ID, a TPMI, or any combination thereof.

In some examples, at least one of the scheduling information for the first data message and the scheduling information for the second data message includes a HARQ process ID, NDI, an RV index, an ID associated with the first wireless device or the second wireless device, an indication that HARQ feedback is enabled, a cast type indicator, CSI request indicator, a zone ID, an indication of a communications range, or any combination thereof.

In some examples, the first data message corresponds to a forward link transmission and the second data message corresponds to a reverse link transmission.

In some examples, the sidelink grant includes first stage SCI and second stage SCI.

Additionally or alternatively, the communications manager 720 may support wireless communication at a first wireless device in accordance with examples as disclosed herein. In some examples, the DCI manager 725 may be configured as or otherwise support a means for receiving, from a base station, a first sidelink grant indicating a first set of resources. In some examples, the SCI manager 730 may be configured as or otherwise support a means for transmitting, to a second wireless device, a second sidelink grant indicating at least the first set of resources. In some examples, the data transmitter 735 may be configured as or otherwise support a means for transmitting, to the second wireless device, a first data message over the first set of resources based on the first sidelink grant, the second sidelink grant, or both. In some examples, the data receiver 740 may be configured as or otherwise support a means for receiving, from the second wireless device, a second data message over a second set of resources, where the second set of resources at least partially overlaps in time with the first set of resources. The feedback receiver 745 may be configured as or otherwise support a means for receiving, from the second wireless device, feedback information related to the first data message. The feedback transmitter 750 may be configured as or otherwise support a means for transmitting, to the base station, the feedback information related to the first data message.

In some examples, the feedback generator 755 may be configured as or otherwise support a means for generating, at the first wireless device, feedback information related to the second data message. In some examples, the joint feedback manager 760 may be configured as or otherwise support a means for transmitting, with the feedback information related to the first data message, the feedback information related to the second data message.

In some examples, the first sidelink grant includes scheduling information for the first data message, the scheduling information indicating a format of the second sidelink grant, a time gap between reception of the first sidelink grant and transmission of the second sidelink grant, a RNTI for inclusion in the second sidelink grant, a UE identifier associated a wireless device transmitting the second sidelink grant, a UE ID associated with a wireless device receiving the second sidelink grant, or any combination thereof.

In some examples, the first sidelink grant includes scheduling information for the first data message, the scheduling information including a HARQ process ID, a NDI, a counter sidelink assignment index, a sidelink time and frequency resource allocation, a sidelink DMRS pattern, a quantity of sidelink DMRS ports and corresponding sidelink DMRS port IDs, a TPMI, a transmit beam ID or a receive beam ID for half-duplex communication between the first wireless device and the second wireless device, a transmit beam ID or a receive beam ID for full-duplex communication between the first wireless device and the second wireless device, a sidelink power control parameter, a MCS ID, a MCS table ID, a CC ID, a BWP ID, a SPS configuration ID, a CG configuration ID, or any combination thereof.

In some examples, the second sidelink grant includes scheduling information for the first data message, the scheduling information including a sidelink priority, a sidelink time and frequency resource allocation, a sidelink DMRS pattern, a quantity of sidelink DMRS ports and corresponding sidelink DMRS port IDs, a MCS ID, a MCS table ID, a format for a PSFCH, a format of a second stage SCI and corresponding offset value, a beam ID for receiving or transmitting the second stage SCI, the first data message or the second data message, a precoding matrix ID, a TPMI, or any combination thereof.

In some examples, the second sidelink grant includes scheduling information for the first data message, the scheduling information including a HARQ process ID, NDI, an RV index, an ID associated with the first wireless device or the second wireless device, an indication that HARQ feedback is enabled, a cast type indicator, CSI request indicator, a zone ID, an indication of a communications range, or any combination thereof.

In some examples, the first data message corresponds to a forward link transmission and the second data message corresponds to a forward link transmission. In some examples, the first data message corresponds to a reverse link transmission and the second data message corresponds to a reverse link transmission. In some examples, a first one of the first data message and the second data message corresponds to a forward link transmission and a second one of the first data message and the second data message corresponds to a reverse link transmission.

In some examples, the second sidelink grant includes first stage SCI and second stage SCI.

Additionally or alternatively, the communications manager 720 may support wireless communication at a second wireless device in accordance with examples as disclosed herein. In some examples, the DCI manager 725 may be configured as or otherwise support a means for receiving, from a base station, a first sidelink grant indicating a first set of resources. In some examples, the SCI manager 730 may be configured as or otherwise support a means for transmitting, to a first wireless device, a second sidelink grant indicating at least the first set of resources. In some examples, the data transmitter 735 may be configured as or otherwise support a means for transmitting, to the first wireless device, a first data message over the first set of resources based on the first sidelink grant, the second sidelink grant, or both. In some examples, the data receiver 740 may be configured as or otherwise support a means for receiving, from the first wireless device, a second data message over a second set of resources, where the second set of resources at least partially overlaps in time with the first set of resources. In some examples, the feedback transmitter 750 may be configured as or otherwise support a means for transmitting, to one of the base station or the first UE, feedback information related to the second data message.

In some examples, the first sidelink grant includes scheduling information for the first data message, the scheduling information indicating a format of the second sidelink grant, a time gap between reception of the first sidelink grant and transmission of the second sidelink grant, a RNTI for inclusion in the second sidelink grant, a UE ID associated with a wireless device transmitting the second sidelink grant, a UE ID associated with a wireless device receiving the second sidelink, or any combination thereof.

In some examples, the first sidelink grant includes scheduling information for the first data message, the scheduling information including a HARQ ID, a NDI, a counter sidelink assignment index, a sidelink time and frequency resource allocation, a sidelink DMRS pattern, a quantity of sidelink DMRS ports and corresponding sidelink DMRS port IDs, a TPMI, a transmit beam ID or a receive beam ID for half-duplex communication between the first wireless device and the second wireless device, a transmit beam ID or a receive beam ID for full-duplex communication between the first wireless device and the second wireless device, a sidelink power control parameter, a MCS ID, a MCS table ID, a CC ID, a BWP ID, a SPS configuration ID, a CG configuration ID, or any combination thereof.

In some examples, the second sidelink grant includes scheduling information for the first data message, the scheduling information including a sidelink priority, a sidelink time and frequency resource allocation, a sidelink DMRS pattern, a quantity of sidelink DMRS ports and corresponding sidelink DMRS port IDs, a MCS ID, a MCS table ID, a format for a PSFCH, a format of a second stage SCI and corresponding offset value, a beam ID for receiving or transmitting the second stage SCI, the first data message or the second data message, a precoding matrix ID, a TPMI, or any combination thereof.

In some examples, the second sidelink grant includes scheduling information for the first data message, the scheduling information including a HARQ process ID, NDI, an RV index, an ID associated with the first wireless device or the second wireless device, an indication that HARQ feedback is enabled, a cast type indicator, CSI request indicator, a zone ID, an indication of a communications range, or any combination thereof.

In some examples, the first data message corresponds to a forward link transmission and the second data message corresponds to a forward link transmission. In some examples, the first data message corresponds to a reverse link transmission and the second data message corresponds to a reverse link transmission. In some examples, a first one of the first data message and the second data message corresponds to a forward link transmission and a second one of the first data message and the second data message corresponds to a reverse link transmission.

In some examples, the second sidelink grant includes first stage SCI and second stage SCI.

Figure 8:
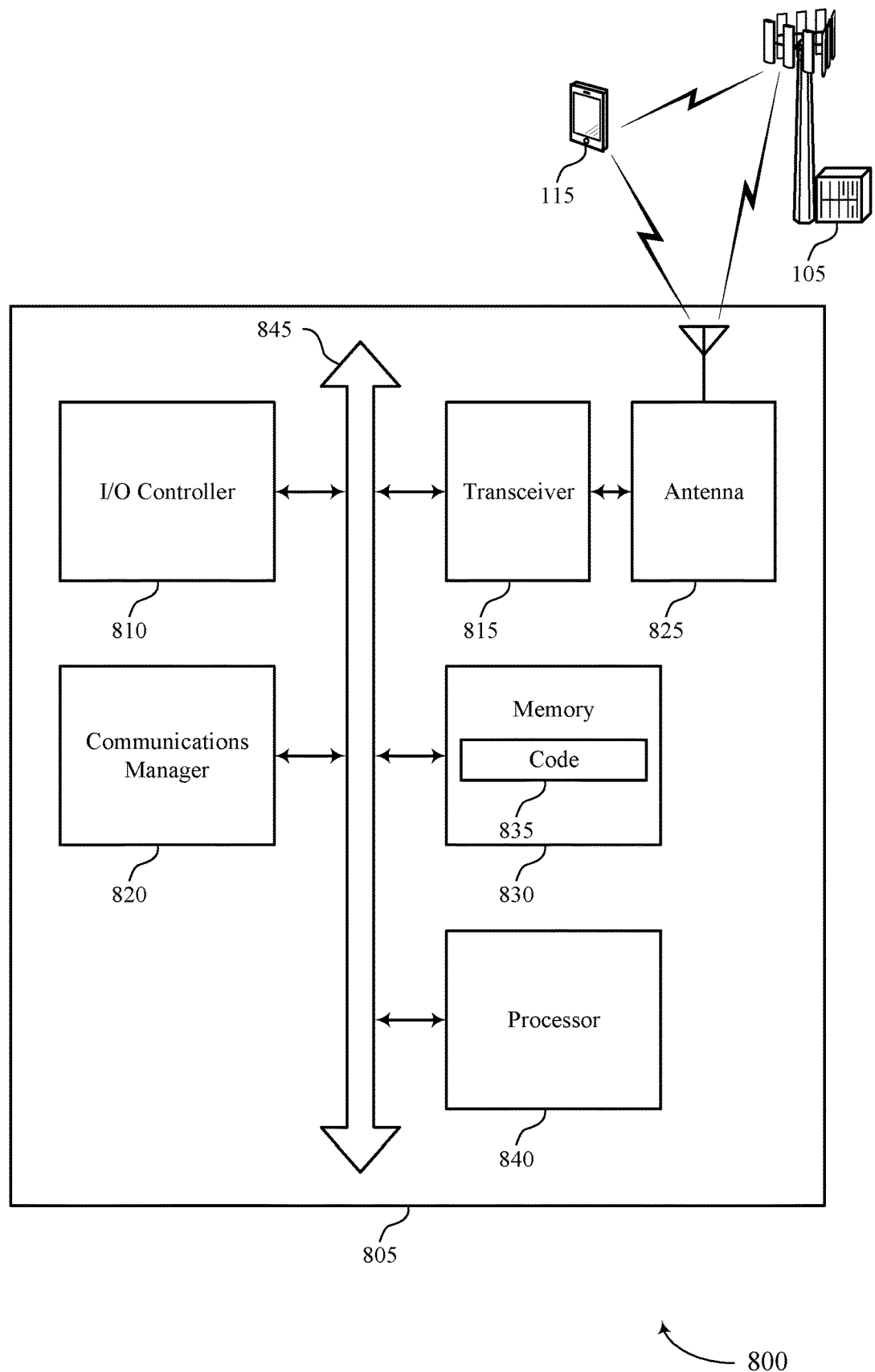
FIG. 8 shows a diagram of a system including a device that supports scheduling full-duplex sidelink communications in accordance with aspects of the present disclosure.

FIG. 8 shows a diagram of a system 800 including a device 805 that supports scheduling full-duplex sidelink communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting scheduling full-duplex sidelink communications). For example, the device 805 or a component of the device 805 may include a processor 840 and memory 830 coupled to the processor 840, the processor 840 and memory 830 configured to perform various functions described herein.

The communications manager 820 may support wireless communication at a first wireless device in accordance with examples as disclosed herein. For example, the communications manager 820 may be configured as or otherwise support a means for receiving, from a base station, a first sidelink grant indicating a first set of resources and a second set of resources, where the first set of resources at least partially overlaps in time with the second set of resources. The communications manager 820 may be configured as or otherwise support a means for transmitting, to a second wireless device, a second sidelink grant indicating the second set of resources. The communications manager 820 may be configured as or otherwise support a means for transmitting, to the second wireless device, a first data message over the first set of resources based on the first sidelink grant, the second sidelink grant, or both. The communications manager 820 may be configured as or otherwise support a means for receiving, from the second wireless device, a second data message over the second set of resources based on the first sidelink grant, the second sidelink grant, or both.

Additionally or alternatively, the communications manager 820 may support wireless communication at a second wireless device in accordance with examples as disclosed herein. For example, the communications manager 820 may be configured as or otherwise support a means for receiving, from a first wireless device, a sidelink grant indicating a first set of resources for a first data message and a second set of resources for a second data message, where the first set of resources at least partially overlaps in time with the second set of resources. The communications manager 820 may be configured as or otherwise support a means for receiving, from the first wireless device, the first data message over the first set of resources based on the sidelink grant. The communications manager 820 may be configured as or otherwise support a means for transmitting, to the first wireless device, the second data message over the second set of resources based on the sidelink grant.

Additionally or alternatively, the communications manager 820 may support wireless communication at a first wireless device in accordance with examples as disclosed herein. For example, the communications manager 820 may be configured as or otherwise support a means for receiving, from a base station, a first sidelink grant indicating a first set of resources. The communications manager 820 may be configured as or otherwise support a means for transmitting, to a second wireless device, a second sidelink grant indicating at least the first set of resources. The communications manager 820 may be configured as or otherwise support a means for transmitting, to the second wireless device, a first data message over the first set of resources based on the first sidelink grant, the second sidelink grant, or both. The communications manager 820 may be configured as or otherwise support a means for receiving, from the second wireless device, a second data message over a second set of resources, where the second set of resources at least partially overlaps in time with the first set of resources. The communications manager 820 may be configured as or otherwise support a means for receiving, from the second wireless device, feedback information related to the first data message. The communications manager 820 may be configured as or otherwise support a means for transmitting, to the base station, the feedback information related to the first data message.

Additionally or alternatively, the communications manager 820 may support wireless communication at a second wireless device in accordance with examples as disclosed herein. For example, the communications manager 820 may be configured as or otherwise support a means for receiving, from a base station, a first sidelink grant indicating a first set of resources. The communications manager 820 may be configured as or otherwise support a means for transmitting, to a first wireless device, a second sidelink grant indicating at least the first set of resources. The communications manager 820 may be configured as or otherwise support a means for transmitting, to the first wireless device, a first data message over the first set of resources based on the first sidelink grant, the second sidelink grant, or both. The communications manager 820 may be configured as or otherwise support a means for receiving, from the first wireless device, a second data message over a second set of resources, where the second set of resources at least partially overlaps in time with the first set of resources. The communications manager 820 may be configured as or otherwise support a means for transmitting, to one of the base station or the first UE, feedback information related to the second data message.

By including or configuring the communications manager 820 in accordance with examples as described herein, the device 805 may support techniques for reduced latency and more efficient utilization of communication resources. The methods as described herein may allow the device 805 to communication with another device 805 in a full-duplex mode. A device 805 that supports full-duplex may transmit a message at the same that a different message is received at the device 805. That is, the device 805 may not have to wait to transmit a message while receive a message resulting in decreased latency when compared to a half-duplex mode of communication.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of scheduling full-duplex sidelink communications as described herein, or the processor 840 and the memory 830 may be otherwise configured to perform or support such operations.

Figure 9:
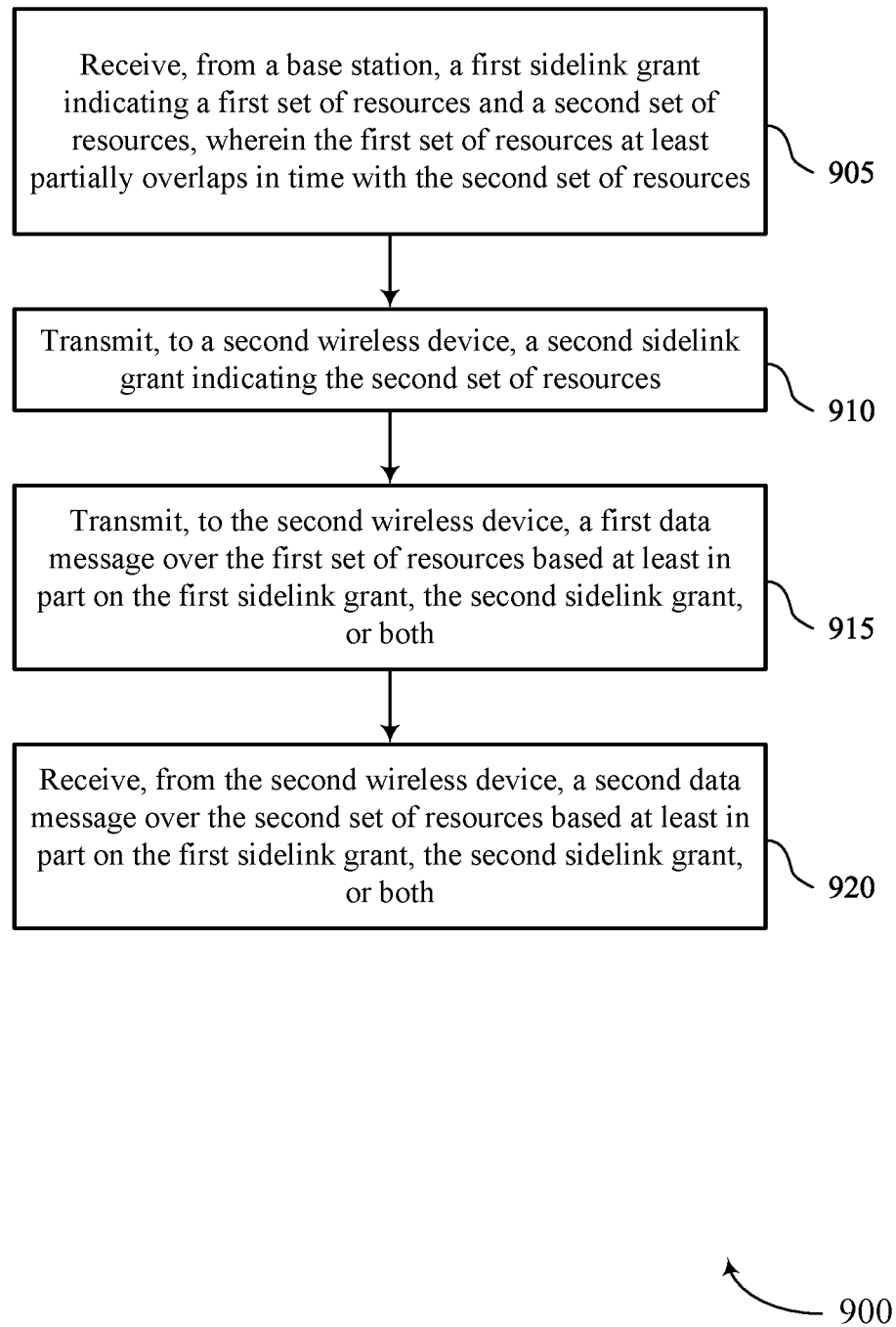
FIGS. 9 through 15 show flowcharts illustrating methods that support scheduling full-duplex sidelink communications in accordance with aspects of the present disclosure.

FIG. 9 shows a flowchart illustrating a method 900 that supports scheduling full-duplex sidelink communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a base station, a first sidelink grant indicating a first set of resources and a second set of resources, where the first set of resources at least partially overlaps in time with the second set of resources. The operations of 905 may be performed in accordance with examples as disclosed herein. In some examples, aspects of the operations of 905 may be performed by a DCI manager 725 as described with reference to FIG. 7.

At 910, the method may include transmitting, to a second wireless device, a second sidelink grant indicating the second set of resources. The operations of 910 may be performed in accordance with examples as disclosed herein. In some examples, aspects of the operations of 910 may be performed by an SCI manager 730 as described with reference to FIG. 7.

At 915, the method may include transmitting, to the second wireless device, a first data message over the first set of resources based on the first sidelink grant, the second sidelink grant, or both. The operations of 915 may be performed in accordance with examples as disclosed herein. In some examples, aspects of the operations of 915 may be performed by a data transmitter 735 as described with reference to FIG. 7.

At 920, the method may include receiving, from the second wireless device, a second data message over the second set of resources based on the first sidelink grant, the second sidelink grant, or both. The operations of 920 may be performed in accordance with examples as disclosed herein. In some examples, aspects of the operations of 920 may be performed by a data receiver 740 as described with reference to FIG. 7.

Figure 10:
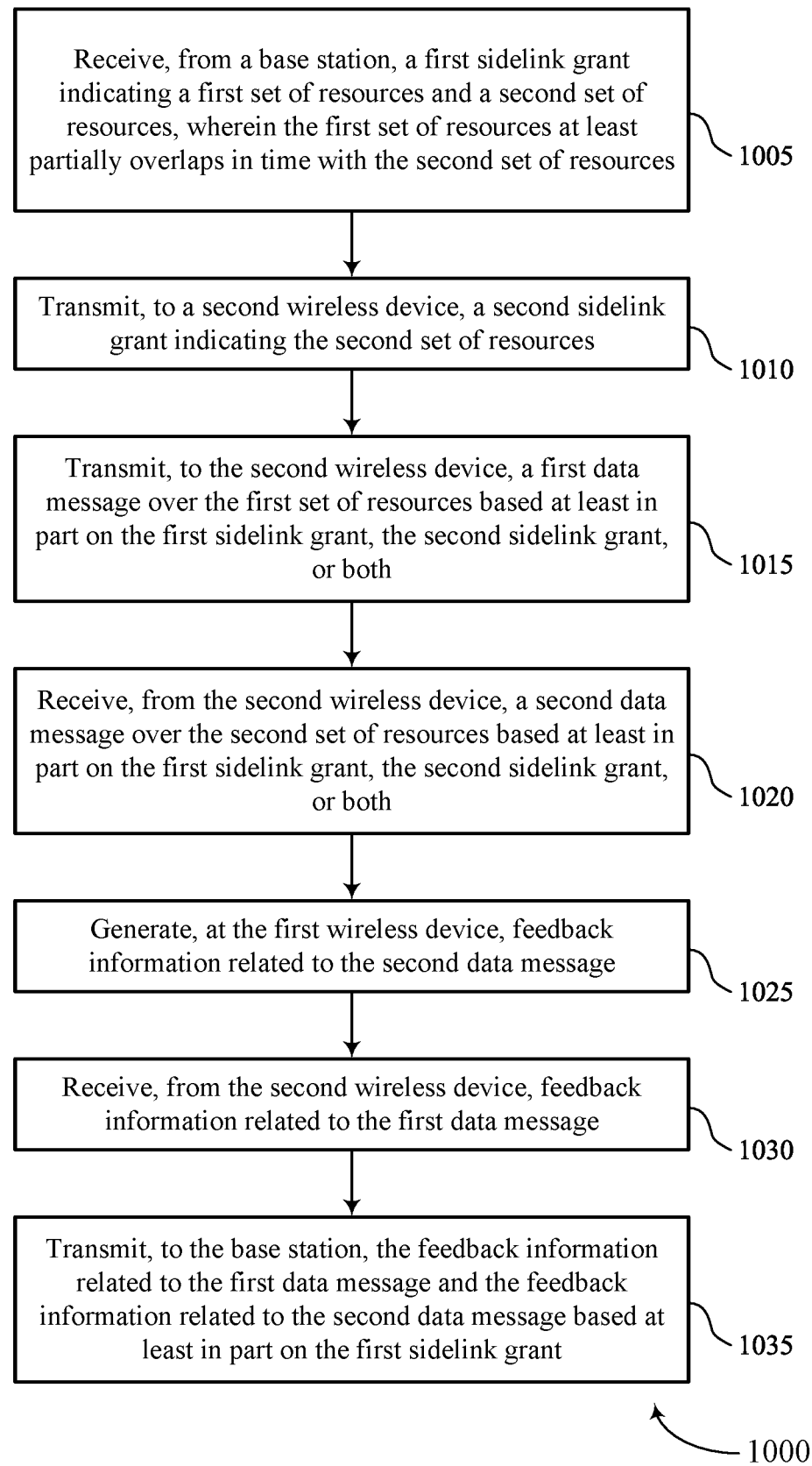

FIG. 10 shows a flowchart illustrating a method 1000 that supports scheduling full-duplex sidelink communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, a first sidelink grant indicating a first set of resources and a second set of resources, where the first set of resources at least partially overlaps in time with the second set of resources. The operations of 1005 may be performed in accordance with examples as disclosed herein. In some examples, aspects of the operations of 1005 may be performed by a DCI manager 725 as described with reference to FIG. 7.

At 1010, the method may include transmitting, to a second wireless device, a second sidelink grant indicating the second set of resources. The operations of 1010 may be performed in accordance with examples as disclosed herein. In some examples, aspects of the operations of 1010 may be performed by an SCI manager 730 as described with reference to FIG. 7.

At 1015, the method may include transmitting, to the second wireless device, a first data message over the first set of resources based on the first sidelink grant, the second sidelink grant, or both. The operations of 1015 may be performed in accordance with examples as disclosed herein. In some examples, aspects of the operations of 1015 may be performed by a data transmitter 735 as described with reference to FIG. 7.

At 1020, the method may include receiving, from the second wireless device, a second data message over the second set of resources based on the first sidelink grant, the second sidelink grant, or both. The operations of 1020 may be performed in accordance with examples as disclosed herein. In some examples, aspects of the operations of 1020 may be performed by a data receiver 740 as described with reference to FIG. 7.

At 1025, the method may include generating, at the first wireless device, feedback information related to the second data message. The operations of 1025 may be performed in accordance with examples as disclosed herein. In some examples, aspects of the operations of 1025 may be performed by a feedback generator 755 as described with reference to FIG. 7.

At 1030, the method may include receiving, from the second wireless device, feedback information related to the first data message. The operations of 1030 may be performed in accordance with examples as disclosed herein. In some examples, aspects of the operations of 1030 may be performed by a feedback receiver 745 as described with reference to FIG. 7.

At 1035, the method may include transmitting, to the base station, the feedback information related to the first data message and the feedback information related to the second data message based on the first sidelink grant. The operations of 1035 may be performed in accordance with examples as disclosed herein. In some examples, aspects of the operations of 1035 may be performed by a joint feedback manager 760 as described with reference to FIG. 7.

Figure 11:
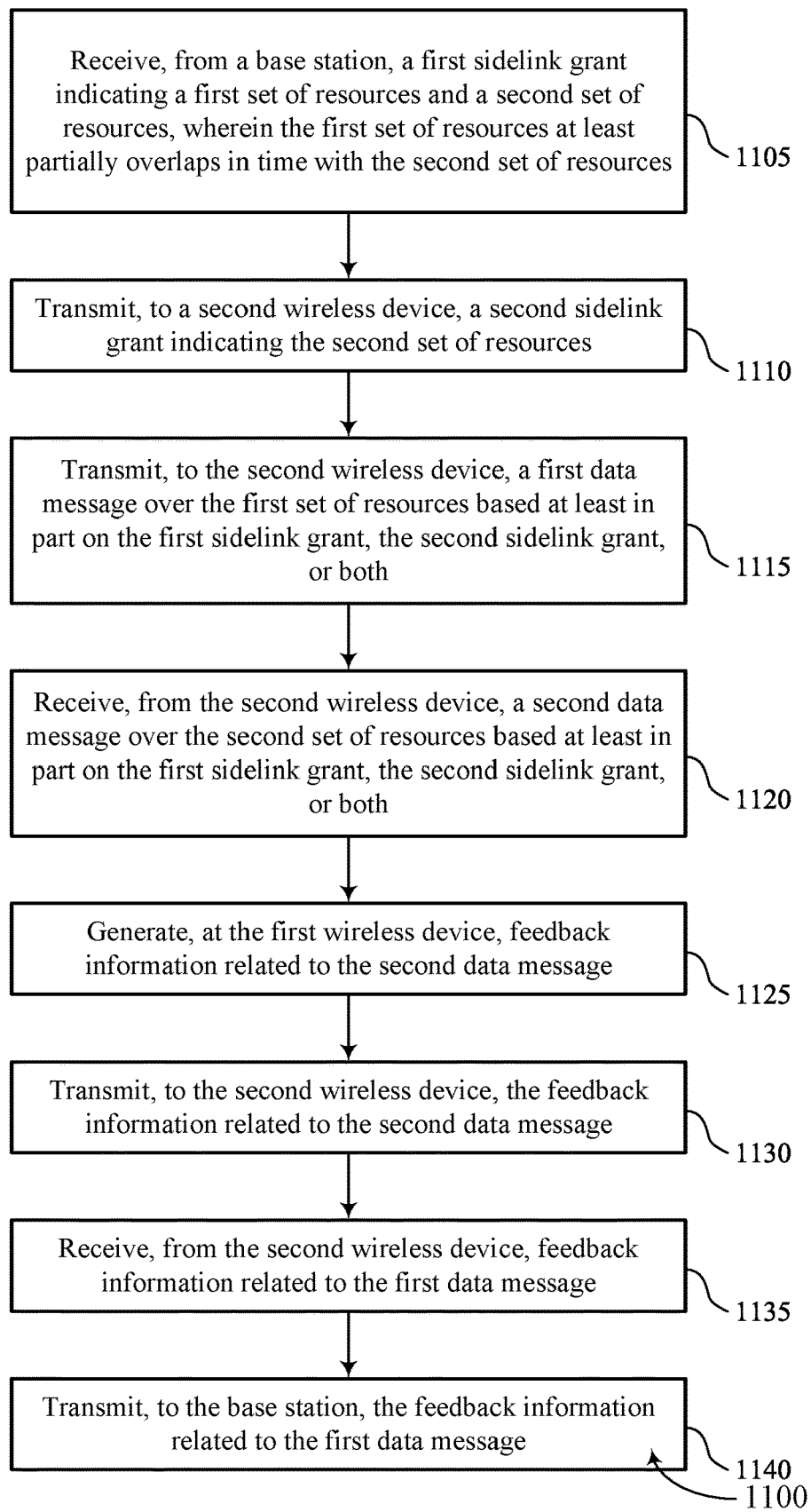

FIG. 11 shows a flowchart illustrating a method 1100 that supports scheduling full-duplex sidelink communications in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, a first sidelink grant indicating a first set of resources and a second set of resources, where the first set of resources at least partially overlaps in time with the second set of resources. The operations of 1105 may be performed in accordance with examples as disclosed herein. In some examples, aspects of the operations of 1105 may be performed by a DCI manager 725 as described with reference to FIG. 7.

At 1110, the method may include transmitting, to a second wireless device, a second sidelink grant indicating the second set of resources. The operations of 1110 may be performed in accordance with examples as disclosed herein. In some examples, aspects of the operations of 1110 may be performed by an SCI manager 730 as described with reference to FIG. 7.

At 1115, the method may include transmitting, to the second wireless device, a first data message over the first set of resources based on the first sidelink grant, the second sidelink grant, or both. The operations of 1115 may be performed in accordance with examples as disclosed herein. In some examples, aspects of the operations of 1115 may be performed by a data transmitter 735 as described with reference to FIG. 7.

At 1120, the method may include receiving, from the second wireless device, a second data message over the second set of resources based on the first sidelink grant, the second sidelink grant, or both. The operations of 1120 may be performed in accordance with examples as disclosed herein. In some examples, aspects of the operations of 1120 may be performed by a data receiver 740 as described with reference to FIG. 7.

At 1125, the method may include generating, at the first wireless device, feedback information related to the second data message. The operations of 1125 may be performed in accordance with examples as disclosed herein. In some examples, aspects of the operations of 1125 may be performed by a feedback generator 755 as described with reference to FIG. 7.

At 1130, the method may include transmitting, to the second wireless device, the feedback information related to the second data message. The operations of 1130 may be performed in accordance with examples as disclosed herein. In some examples, aspects of the operations of 1130 may be performed by a feedback transmitter 750 as described with reference to FIG. 7.

At 1135, the method may include receiving, from the second wireless device, feedback information related to the first data message. The operations of 1135 may be performed in accordance with examples as disclosed herein. In some examples, aspects of the operations of 1135 may be performed by a feedback receiver 745 as described with reference to FIG. 7.

At 1140, the method may include transmitting, to the base station, the feedback information related to the first data message. The operations of 1140 may be performed in accordance with examples as disclosed herein. In some examples, aspects of the operations of 1140 may be performed by a feedback transmitter 750 as described with reference to FIG. 7.

Figure 12:
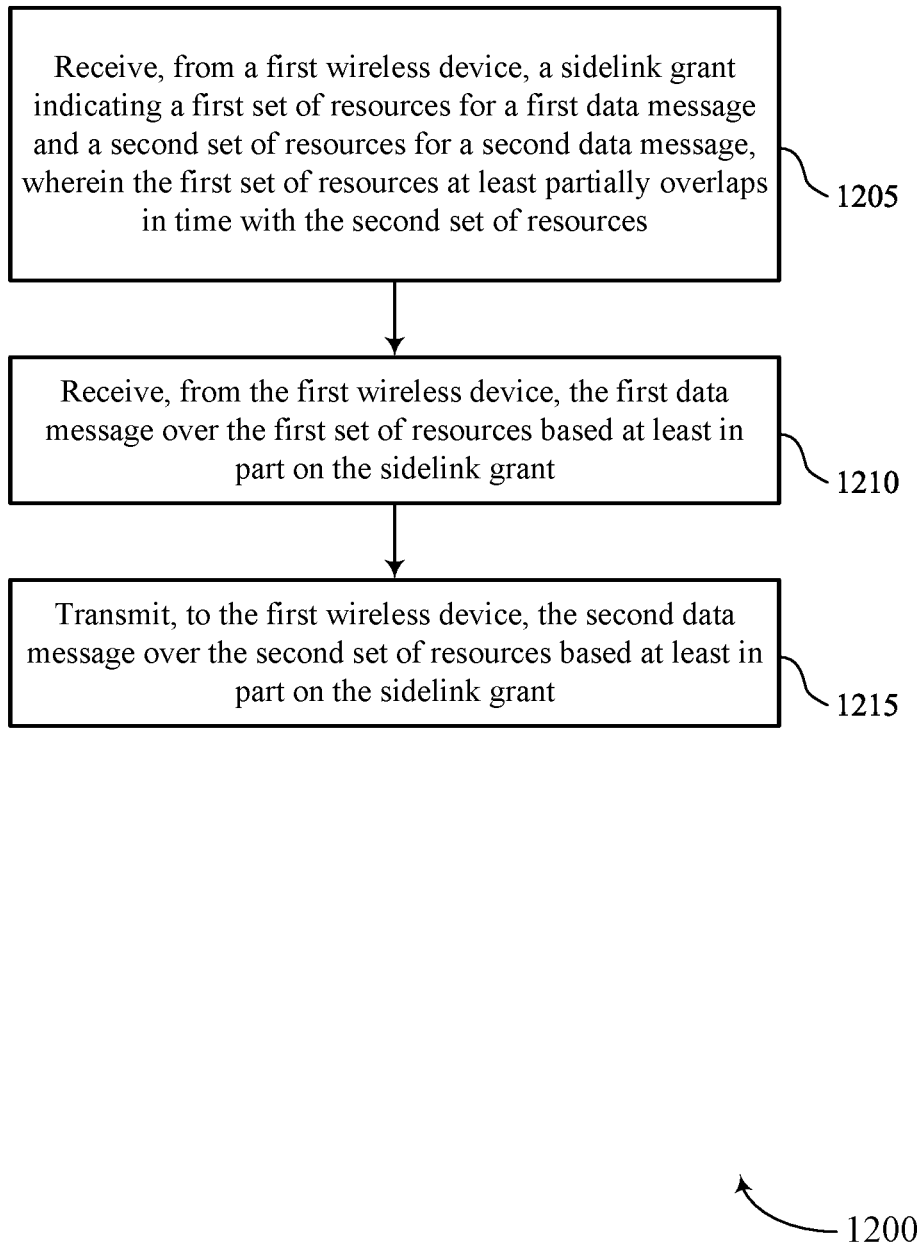

FIG. 12 shows a flowchart illustrating a method 1200 that supports scheduling full-duplex sidelink communications in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, from a first wireless device, a sidelink grant indicating a first set of resources for a first data message and a second set of resources for a second data message, where the first set of resources at least partially overlaps in time with the second set of resources. The operations of 1205 may be performed in accordance with examples as disclosed herein. In some examples, aspects of the operations of 1205 may be performed by an SCI manager 730 as described with reference to FIG. 7.

At 1210, the method may include receiving, from the first wireless device, the first data message over the first set of resources based on the sidelink grant. The operations of 1210 may be performed in accordance with examples as disclosed herein. In some examples, aspects of the operations of 1210 may be performed by a data receiver 740 as described with reference to FIG. 7.

At 1215, the method may include transmitting, to the first wireless device, the second data message over the second set of resources based on the sidelink grant. The operations of 1215 may be performed in accordance with examples as disclosed herein. In some examples, aspects of the operations of 1215 may be performed by a data transmitter 735 as described with reference to FIG. 7.

Figure 13:
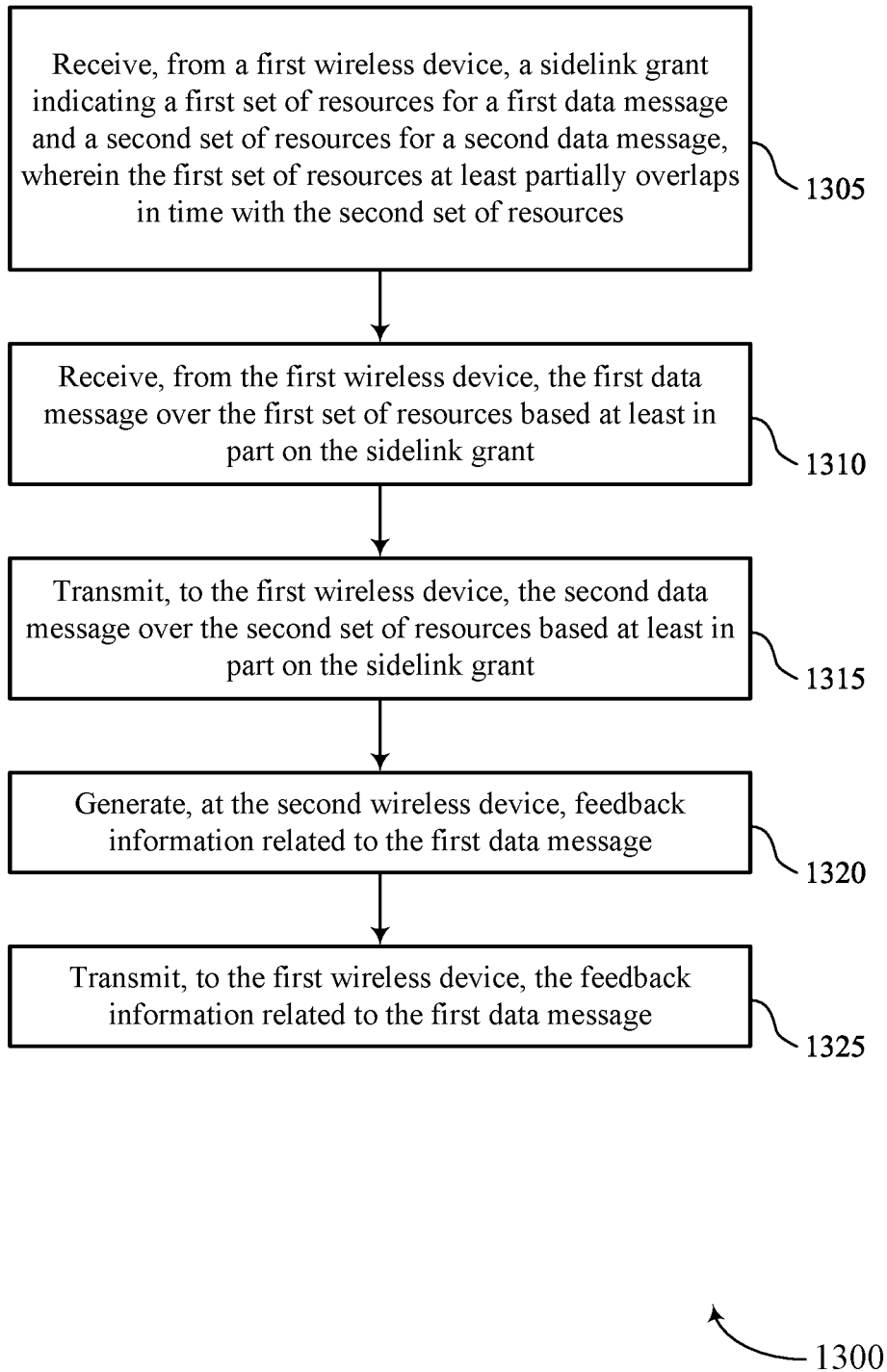

FIG. 13 shows a flowchart illustrating a method 1300 that supports scheduling full-duplex sidelink communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a first wireless device, a sidelink grant indicating a first set of resources for a first data message and a second set of resources for a second data message, where the first set of resources at least partially overlaps in time with the second set of resources. The operations of 1305 may be performed in accordance with examples as disclosed herein. In some examples, aspects of the operations of 1305 may be performed by an SCI manager 730 as described with reference to FIG. 7.

At 1310, the method may include receiving, from the first wireless device, the first data message over the first set of resources based on the sidelink grant. The operations of 1310 may be performed in accordance with examples as disclosed herein. In some examples, aspects of the operations of 1310 may be performed by a data receiver 740 as described with reference to FIG. 7.

At 1315, the method may include transmitting, to the first wireless device, the second data message over the second set of resources based on the sidelink grant. The operations of 1315 may be performed in accordance with examples as disclosed herein. In some examples, aspects of the operations of 1315 may be performed by a data transmitter 735 as described with reference to FIG. 7.

At 1320, the method may include generating, at the second wireless device, feedback information related to the first data message. The operations of 1320 may be performed in accordance with examples as disclosed herein. In some examples, aspects of the operations of 1320 may be performed by a feedback generator 755 as described with reference to FIG. 7.

At 1325, the method may include transmitting, to the first wireless device, the feedback information related to the first data message. The operations of 1325 may be performed in accordance with examples as disclosed herein. In some examples, aspects of the operations of 1325 may be performed by a feedback transmitter 750 as described with reference to FIG. 7.

Figure 14:
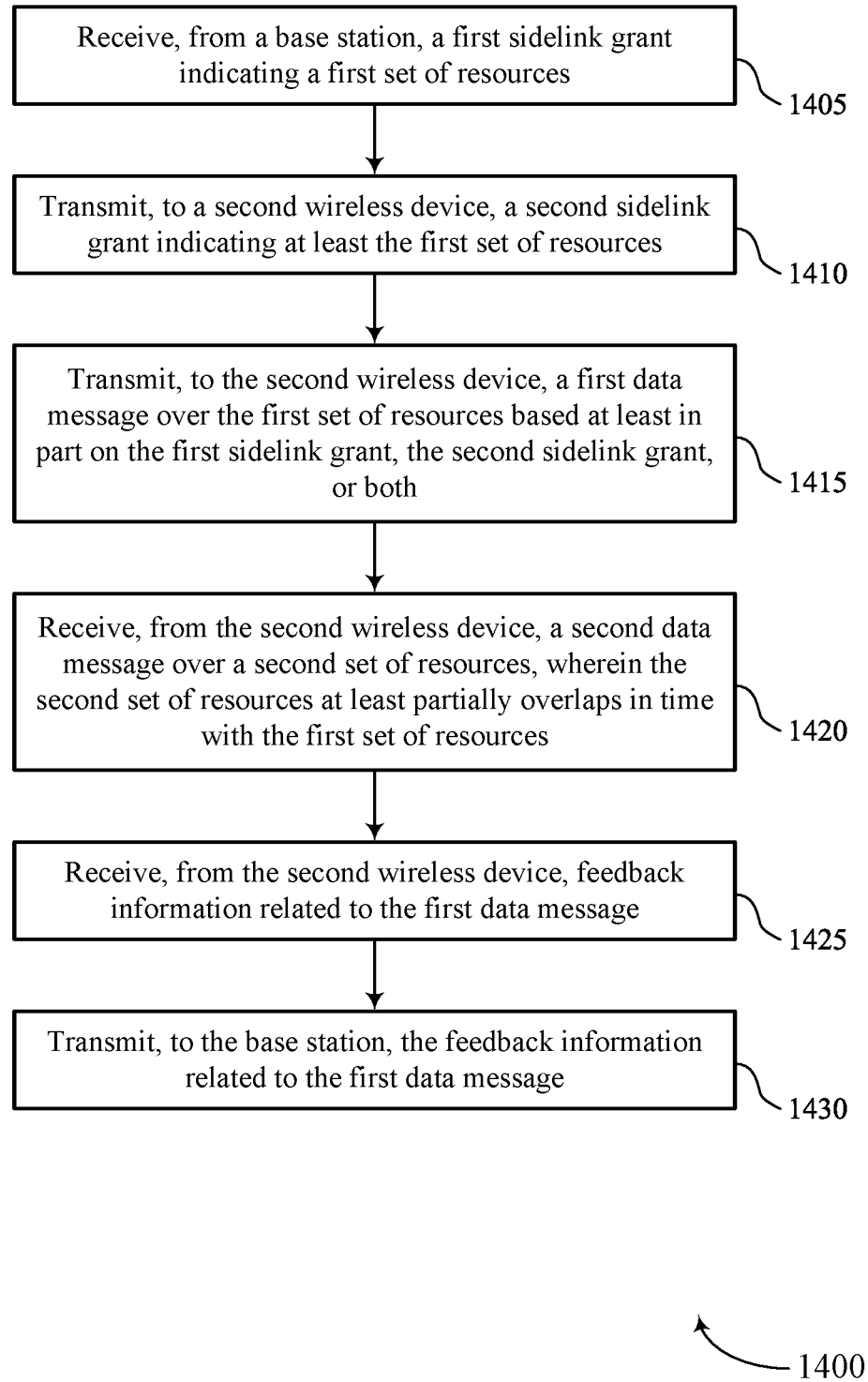

FIG. 14 shows a flowchart illustrating a method 1400 that supports scheduling full-duplex sidelink communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a first sidelink grant indicating a first set of resources. The operations of 1405 may be performed in accordance with examples as disclosed herein. In some examples, aspects of the operations of 1405 may be performed by a DCI manager 725 as described with reference to FIG. 7.

At 1410, the method may include transmitting, to a second wireless device, a second sidelink grant indicating at least the first set of resources. The operations of 1410 may be performed in accordance with examples as disclosed herein. In some examples, aspects of the operations of 1410 may be performed by an SCI manager 730 as described with reference to FIG. 7.

At 1415, the method may include transmitting, to the second wireless device, a first data message over the first set of resources based on the first sidelink grant, the second sidelink grant, or both. The operations of 1415 may be performed in accordance with examples as disclosed herein. In some examples, aspects of the operations of 1415 may be performed by a data transmitter 735 as described with reference to FIG. 7.

At 1420, the method may include receiving, from the second wireless device, a second data message over a second set of resources, where the second set of resources at least partially overlaps in time with the first set of resources. The operations of 1420 may be performed in accordance with examples as disclosed herein. In some examples, aspects of the operations of 1420 may be performed by a data receiver 740 as described with reference to FIG. 7.

At 1425, the method may include receiving, from the second wireless device, feedback information related to the first data message. The operations of 1425 may be performed in accordance with examples as disclosed herein. In some examples, aspects of the operations of 1425 may be performed by a feedback receiver 745 as described with reference to FIG. 7.

At 1430, the method may include transmitting, to the base station, the feedback information related to the first data message. The operations of 1430 may be performed in accordance with examples as disclosed herein. In some examples, aspects of the operations of 1430 may be performed by a feedback transmitter 750 as described with reference to FIG. 7.

Figure 15:
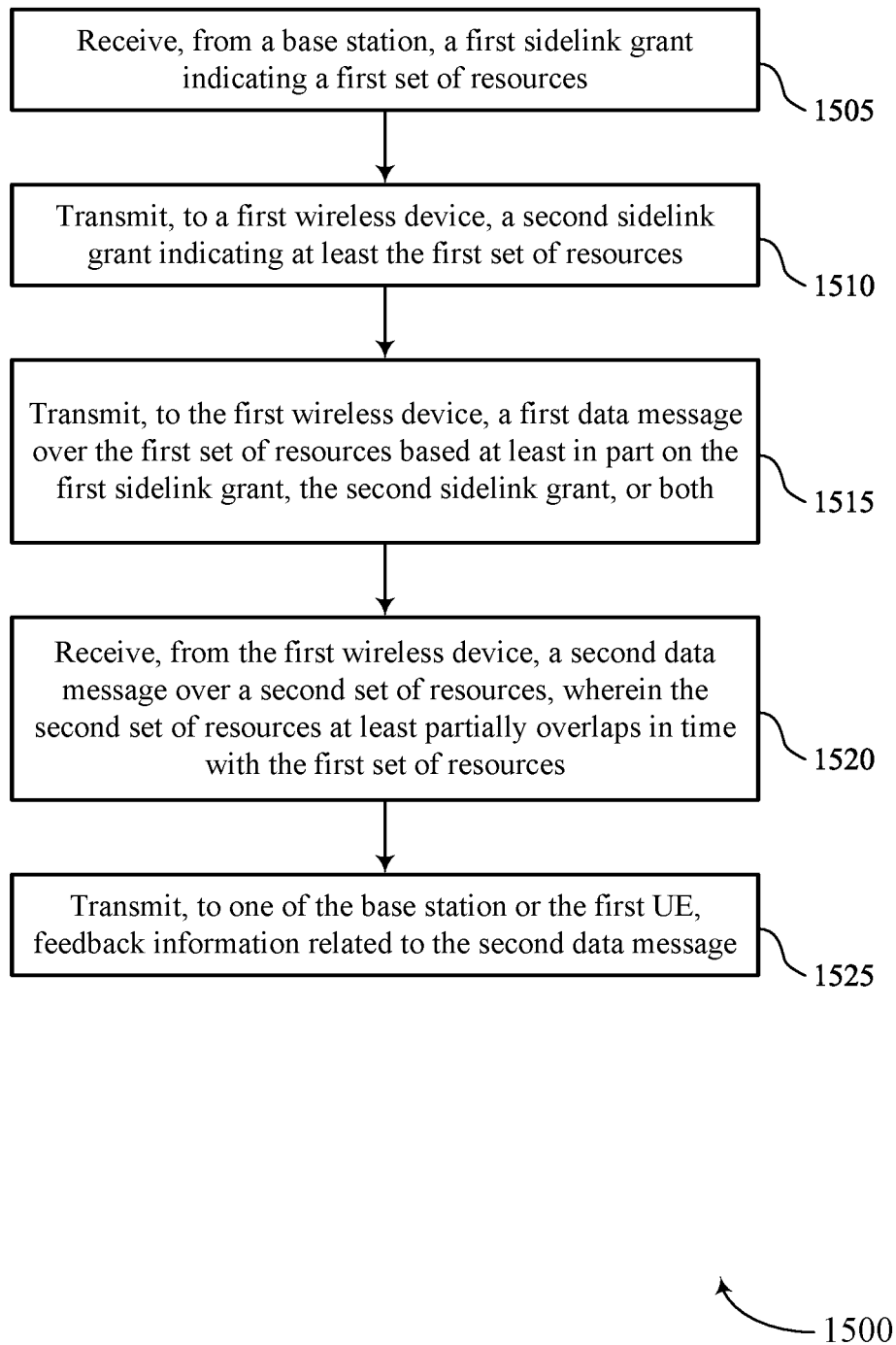

FIG. 15 shows a flowchart illustrating a method 1500 that supports scheduling full-duplex sidelink communications in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a first sidelink grant indicating a first set of resources. The operations of 1505 may be performed in accordance with examples as disclosed herein. In some examples, aspects of the operations of 1505 may be performed by a DCI manager 725 as described with reference to FIG. 7.

At 1510, the method may include transmitting, to a first wireless device, a second sidelink grant indicating at least the first set of resources. The operations of 1510 may be performed in accordance with examples as disclosed herein. In some examples, aspects of the operations of 1510 may be performed by an SCI manager 730 as described with reference to FIG. 7.

At 1515, the method may include transmitting, to the first wireless device, a first data message over the first set of resources based on the first sidelink grant, the second sidelink grant, or both. The operations of 1515 may be performed in accordance with examples as disclosed herein. In some examples, aspects of the operations of 1515 may be performed by a data transmitter 735 as described with reference to FIG. 7.

At 1520, the method may include receiving, from the first wireless device, a second data message over a second set of resources, where the second set of resources at least partially overlaps in time with the first set of resources. The operations of 1520 may be performed in accordance with examples as disclosed herein. In some examples, aspects of the operations of 1520 may be performed by a data receiver 740 as described with reference to FIG. 7.

At 1525, the method may include transmitting, to one of the base station or the first UE, feedback information related to the second data message. The operations of 1525 may be performed in accordance with examples as disclosed herein. In some examples, aspects of the operations of 1525 may be performed by a feedback transmitter 750 as described with reference to FIG. 7.

The following provides an overview of aspects of the present disclosure:

Aspect 1: A method for wireless communication at a first wireless device, comprising: receiving, from a base station, a first sidelink grant indicating a first set of resources and a second set of resources, wherein the first set of resources at least partially overlaps in time with the second set of resources; transmitting, to a second wireless device, a second sidelink grant indicating the second set of resources; transmitting, to the second wireless device, a first data message over the first set of resources based at least in part on the first sidelink grant, the second sidelink grant, or both; and receiving, from the second wireless device, a second data message over the second set of resources based at least in part on the first sidelink grant, the second sidelink grant, or both.

Aspect 2: The method of aspect 1, further comprising: generating, at the first wireless device, feedback information related to the second data message; receiving, from the second wireless device, feedback information related to the first data message; and transmitting, to the base station, the feedback information related to the first data message and the feedback information related to the second data message based at least in part on the first sidelink grant.

Aspect 3: The method of aspect 1, further comprising: generating, at the first wireless device, feedback information related to the second data message; transmitting, to the second wireless device, the feedback information related to the second data message; receiving, from the second wireless device, feedback information related to the first data message; and transmitting, to the base station, the feedback information related to the first data message.

Aspect 4: The method of any of aspects 1 through 3, wherein the first sidelink grant indicates a format of the second sidelink grant, a time gap between reception of the first sidelink grant and transmission of the second sidelink grant, an RNTI for inclusion in the second sidelink grant, a UE ID associated with a wireless device transmitting the second sidelink grant, a UE ID associated with a wireless device receiving the second sidelink grant, or any combination thereof.

Aspect 5: The method of any of aspects 1 through 4, wherein the first sidelink grant comprises scheduling information for the first data message and scheduling information for the second data message.

Aspect 6: The method of aspect 5, wherein at least one of the scheduling information for the first data message and the scheduling information for the second data message comprises a sidelink resource pool ID, a HARQ process ID, a NDI, a counter sidelink assignment index, a sidelink time and frequency resource allocation, a sidelink DMRS pattern, a quantity of sidelink DMRS ports and corresponding sidelink DMRS IDs, a TPMI, a transmit beam ID or a receive beam ID for half-duplex communication between the first wireless device and the second wireless device, a transmit beam ID or a receive beam ID for full-duplex communication between the first wireless device and the second wireless device, a sidelink power control parameter, a MCS ID, a MCS table ID, a CC ID, a BWP ID, a SPS configuration ID, a CG configuration ID, or any combination thereof.

Aspect 7: The method of any of aspects 1 through 6, wherein the second sidelink grant comprises scheduling information for the first data message and scheduling information for the second data message.

Aspect 8: The method of aspect 7, wherein at least one of the scheduling information for the first data message and the scheduling information for the second data message comprises a sidelink priority, a sidelink time and frequency resource allocation, a sidelink DMRS pattern, a quantity of sidelink DMRS ports and corresponding sidelink DMRS IDs, a MCS ID, a MCS table ID, a format for a PSFCH, a format of a second stage SCI and corresponding offset value, a beam ID for receiving or transmitting the second stage SCI, the first data message or the second data message, a PMI, a TPMI, or any combination thereof.

Aspect 9: The method of any of aspects 7 through 8, wherein at least one of the scheduling information for the first data message and the scheduling information for the second data message comprises a HARQ process ID, NDI, an RV index, an ID associated with the first wireless device or the second wireless device, an indication that HARQ feedback is enabled, a cast type indicator, CSI request indicator, a zone ID, an indication of a communications range, or any combination thereof.

Aspect 10: The method of any of aspects 1 through 9, wherein the second sidelink grant comprises a reverse link grant corresponding to the second data message and a forward link grant corresponding to the first data message, the reverse link grant and the forward link grant indicating different sets of parameters.

Aspect 11: The method of any of aspects 1 through 10, wherein the first data message corresponds to a forward link transmission and the second data message corresponds to a reverse link transmission.

Aspect 12: The method of any of aspects 1 through 11, wherein the second sidelink grant comprises first stage SCI and second stage SCI.

Aspect 13: The method of any of aspects 1 through 12, wherein receiving the first sidelink grant is based at least in part on a capability of the first wireless device, a link quality between the first wireless device and the base station, or any combination thereof.

Aspect 14: A method for wireless communication at a second wireless device, comprising: receiving, from a first wireless device, a sidelink grant indicating a first set of resources for a first data message and a second set of resources for a second data message, wherein the first set of resources at least partially overlaps in time with the second set of resources; receiving, from the first wireless device, the first data message over the first set of resources based at least in part on the sidelink grant; and transmitting, to the first wireless device, the second data message over the second set of resources based at least in part on the sidelink grant.

Aspect 15: The method of aspect 14, further comprising: generating, at the second wireless device, feedback information related to the first data message; and transmitting, to the first wireless device, the feedback information related to the first data message.

Aspect 16: The method of aspect 14, further comprising: generating, at the second wireless device, feedback information related to the first data message; transmitting, to the first wireless device, the feedback information related to the first data message; receiving, from the first wireless device, feedback information related to the second data message; and transmitting, to a base station, the feedback information related to the second data message.

Aspect 17: The method of any of aspects 14 through 16, wherein the sidelink grant comprises scheduling information for the first data message and scheduling information for the second data message.

Aspect 18: The method of aspect 17, wherein at least one of the scheduling information for the first data message and the scheduling information for the second data message comprises a sidelink priority, a sidelink time and frequency resource allocation, a sidelink DMRS pattern, a quantity of sidelink DMRS ports and corresponding sidelink DMRS IDs, a MCS ID, a MCS table ID, a format for a PSFCH, a format of a second stage SCI and corresponding offset value, a beam ID for receiving or transmitting the second stage SCI, the first data message or the second data message, a PMI, a TPMI, or any combination thereof.

Aspect 19: The method of any of aspects 17 through 18, wherein at least one of the scheduling information for the first data message and the scheduling information for the second data message comprises a HARQ process ID, NDI, an RV index, an ID associated with the first wireless device or the second wireless device, an indication that HARQ feedback is enabled, a cast type indicator, CSI request indicator, a zone ID, an indication of a communications range, or any combination thereof.

Aspect 20: The method of any of aspects 14 through 19, wherein the first data message corresponds to a forward link transmission and the second data message corresponds to a reverse link transmission.

Aspect 21: The method of any of aspects 14 through 20, wherein the sidelink grant comprises first stage SCI and second stage SCI.

Aspect 22: A method for wireless communication at a first wireless device, comprising: receiving, from a base station, a first sidelink grant indicating a first set of resources; transmitting, to a second wireless device, a second sidelink grant indicating at least the first set of resources; transmitting, to the second wireless device, a first data message over the first set of resources based at least in part on the first sidelink grant, the second sidelink grant, or both; receiving, from the second wireless device, a second data message over a second set of resources, wherein the second set of resources at least partially overlaps in time with the first set of resources; receiving, from the second wireless device, feedback information related to the first data message; and transmitting, to the base station, the feedback information related to the first data message.

Aspect 23: The method of aspect 22, further comprising: generating, at the first wireless device, feedback information related to the second data message; and transmitting, with the feedback information related to the first data message, the feedback information related to the second data message.

Aspect 24: The method of any of aspects 22 through 23, wherein the first sidelink grant comprises scheduling information for the first data message, the scheduling information indicating a format of the second sidelink grant, a time gap between reception of the first sidelink grant and transmission of the second sidelink grant, an RNTI for inclusion in the second sidelink grant, a UE ID associated a wireless device transmitting the second sidelink grant, a UE ID associated with a wireless device receiving the second sidelink grant, or any combination thereof.

Aspect 25: The method of any of aspects 22 through 24, wherein the first sidelink grant comprises scheduling information for the first data message, the scheduling information comprising a sidelink resource pool ID, a HARQ process ID, a NDI, a counter sidelink assignment index, a sidelink time and frequency resource allocation, a sidelink DMRS pattern, a quantity of sidelink DMRS ports and corresponding sidelink DMRS IDs, a TPMI, a transmit beam ID or a receive beam ID for half-duplex communication between the first wireless device and the second wireless device, a transmit beam ID or a receive beam ID for full-duplex communication between the first wireless device and the second wireless device, a sidelink power control parameter, a MCS ID, a MCS table ID, a CC ID, a BWP ID, a SPS configuration ID, a CG configuration ID, or any combination thereof.

Aspect 26: The method of any of aspects 22 through 25, wherein the second sidelink grant comprises scheduling information for the first data message, the scheduling information comprising a sidelink priority, a sidelink time and frequency resource allocation, a sidelink DMRS pattern, a quantity of sidelink DMRS ports and corresponding sidelink DMRS IDs, a MCS ID, a MCS table ID, a format for a PSFCH, a format of a second stage SCI and corresponding offset value, a beam ID for receiving or transmitting the second stage SCI, the first data message or the second data message, a PMI, a TPMI, or any combination thereof.

Aspect 27: The method of any of aspects 22 through 26, wherein the second sidelink grant comprises scheduling information for the first data message, the scheduling information comprising a HARQ process ID, NDI, an RV index, an ID associated with the first wireless device or the second wireless device, an indication that HARQ feedback is enabled, a cast type indicator, CSI request indicator, a zone ID, an indication of a communications range, or any combination thereof.

Aspect 28: The method of any of aspects 22 through 27, wherein the first data message corresponds to a forward link transmission and the second data message corresponds to a forward link transmission; the first data message corresponds to a reverse link transmission and the second data message corresponds to a reverse link transmission; or a first one of the first data message and the second data message corresponds to a forward link transmission and a second one of the first data message and the second data message corresponds to a reverse link transmission.

Aspect 29: The method of any of aspects 22 through 28, wherein the second sidelink grant comprises first stage SCI and second stage SCI.

Aspect 30: A method for wireless communication at a second wireless device, comprising: receiving, from a base station, a first sidelink grant indicating a first set of resources; transmitting, to a first wireless device, a second sidelink grant indicating at least the first set of resources; transmitting, to the first wireless device, a first data message over the first set of resources based at least in part on the first sidelink grant, the second sidelink grant, or both; receiving, from the first wireless device, a second data message over a second set of resources, wherein the second set of resources at least partially overlaps in time with the first set of resources; and transmitting, to one of the base station or the first UE, feedback information related to the second data message.

Aspect 31: The method of aspect 30, wherein the first sidelink grant comprises scheduling information for the first data message, the scheduling information indicating a format of the second sidelink grant, a time gap between reception of the first sidelink grant and transmission of the second sidelink grant, an RNTI for inclusion in the second sidelink grant, a UE ID associated with a wireless device transmitting the second sidelink grant, a UE ID associated with a wireless device receiving the second sidelink, or any combination thereof.

Aspect 32: The method of any of aspects 30 through 31, wherein the first sidelink grant comprises scheduling information for the first data message, the scheduling information comprising a sidelink resource pool ID, a HARQ process ID, a NDI, a counter sidelink assignment index, a sidelink time and frequency resource allocation, a sidelink DMRS pattern, a quantity of sidelink DMRS ports and corresponding sidelink DMRS IDs, a TPMI, a transmit beam ID or a receive beam ID for half-duplex communication between the first wireless device and the second wireless device, a transmit beam ID or a receive beam ID for full-duplex communication between the first wireless device and the second wireless device, a sidelink power control parameter, a MCS ID, a MCS table ID, a CC ID, a BWP ID, a SPS configuration ID, a CG configuration ID, or any combination thereof.

Aspect 33: The method of any of aspects 30 through 32, wherein the second sidelink grant comprises scheduling information for the first data message, the scheduling information comprising a sidelink priority, a sidelink time and frequency resource allocation, a sidelink DMRS pattern, a quantity of sidelink DMRS ports and corresponding sidelink DMRS IDs, a MCS ID, a MCS table ID, a format for a PSFCH, a format of a second stage SCI and corresponding offset value, a beam ID for receiving or transmitting the second stage SCI, the first data message or the second data message, a PMI, a TPMI, or any combination thereof.

Aspect 34: The method of any of aspects 30 through 33, wherein the second sidelink grant comprises scheduling information for the first data message, the scheduling information comprising a HARQ process ID, NDI, an RV index, an ID associated with the first wireless device or the second wireless device, an indication that HARQ feedback is enabled, a cast type indicator, CSI request indicator, a zone ID, an indication of a communications range, or any combination thereof.

Aspect 35: The method of any of aspects 30 through 34, wherein the first data message corresponds to a forward link transmission and the second data message corresponds to a forward link transmission; the first data message corresponds to a reverse link transmission and the second data message corresponds to a reverse link transmission; or a first one of the first data message and the second data message corresponds to a forward link transmission and a second one of the first data message and the second data message corresponds to a reverse link transmission.

Aspect 36: The method of any of aspects 30 through 35, wherein the second sidelink grant comprises first stage SCI and second stage SCI.

Aspect 37: An apparatus for wireless communication at a first wireless device, comprising a processor; memory coupled with the processor; and instructions stored in the memory and executable by the processor to cause the apparatus to perform a method of any of aspects 1 through 13.

Aspect 38: An apparatus for wireless communication at a first wireless device, comprising at least one means for performing a method of any of aspects 1 through 13.

Aspect 39: A non-transitory computer-readable medium storing code for wireless communication at a first wireless device, the code comprising instructions executable by a processor to perform a method of any of aspects 1 through 13.

Aspect 40: An apparatus for wireless communication at a second wireless device, comprising a processor; memory coupled with the processor; and instructions stored in the memory and executable by the processor to cause the apparatus to perform a method of any of aspects 14 through 21.

Aspect 41: An apparatus for wireless communication at a second wireless device, comprising at least one means for performing a method of any of aspects 14 through 21.

Aspect 42: A non-transitory computer-readable medium storing code for wireless communication at a second wireless device, the code comprising instructions executable by a processor to perform a method of any of aspects 14 through 21.

Aspect 43: An apparatus for wireless communication at a first wireless device, comprising a processor; memory coupled with the processor; and instructions stored in the memory and executable by the processor to cause the apparatus to perform a method of any of aspects 22 through 29.

Aspect 44: An apparatus for wireless communication at a first wireless device, comprising at least one means for performing a method of any of aspects 22 through 29.

Aspect 45: A non-transitory computer-readable medium storing code for wireless communication at a first wireless device, the code comprising instructions executable by a processor to perform a method of any of aspects 22 through 29.

Aspect 46: An apparatus for wireless communication at a second wireless device, comprising a processor; memory coupled with the processor; and instructions stored in the memory and executable by the processor to cause the apparatus to perform a method of any of aspects 30 through 36.

Aspect 47: An apparatus for wireless communication at a second wireless device, comprising at least one means for performing a method of any of aspects 30 through 36.

Aspect 48: A non-transitory computer-readable medium storing code for wireless communication at a second wireless device, the code comprising instructions executable by a processor to perform a method of any of aspects 30 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
   receiving, from a network device, a first sidelink grant for sidelink full-duplex communication between the first wireless device and a second wireless device, the first sidelink grant indicating that a first set of resources is for transmission of a first sidelink data message from the first wireless device to the second wireless device and further indicating that a second set of resources is for reception of a second sidelink data message at the first wireless device from the second wireless device, wherein the first set of resources at least partially overlaps in time with the second set of resources;
   transmitting, to the second wireless device via a third set of resources, a second sidelink grant indicating the second set of resources;
   transmitting, to the second wireless device, the first sidelink data message via the first set of resources based at least in part on the first sidelink grant, the second sidelink grant, or both; and
   receiving, from the second wireless device, the second sidelink data message via the second set of resources based at least in part on the first sidelink grant, the second sidelink grant, or both.

2. The method of claim 1, further comprising:
   generating, at the first wireless device, feedback information related to the second sidelink data message;
   receiving, from the second wireless device, feedback information related to the first sidelink data message; and
   transmitting, to the network device, the feedback information related to the first sidelink data message and the feedback information related to the second sidelink data message based at least in part on the first sidelink grant.

3. The method of claim 1, further comprising:
   generating, at the first wireless device, feedback information related to the second sidelink data message;
   transmitting, to the second wireless device, the feedback information related to the second sidelink data message;
   receiving, from the second wireless device, feedback information related to the first sidelink data message; and
   transmitting, to the network device, the feedback information related to the first sidelink data message.

4. The method of claim 1, wherein the first sidelink grant indicates a format of the second sidelink grant, a time gap between reception of the first sidelink grant and transmission of the second sidelink grant, a radio network temporary identifier for inclusion in the second sidelink grant, a user equipment (UE) identifier associated with a wireless device transmitting the second sidelink grant, a UE identifier associated with a wireless device receiving the second sidelink grant, or any combination thereof.

5. The method of claim 1, wherein the first sidelink grant comprises scheduling information for the first sidelink data message and scheduling information for the second sidelink data message.

6. The method of claim 5, wherein at least one of the scheduling information for the first sidelink data message and the scheduling information for the second sidelink data message comprises a sidelink resource pool identifier, a hybrid automatic repeat request process identifier, a new data indicator, a counter sidelink assignment index, a sidelink time and frequency resource allocation, a sidelink demodulation reference signal pattern, a quantity of sidelink demodulation reference signal ports and corresponding sidelink demodulation reference signal identifiers, a transmit precoding matrix identifier, a transmit beam identifier or a receive beam identifier for half-duplex communication between the first wireless device and the second wireless device, a transmit beam identifier or a receive beam identifier for full-duplex communication between the first wireless device and the second wireless device, a sidelink power control parameter, a modulation and coding scheme identifier, a modulation and coding scheme table identifier, a component carrier identifier, a bandwidth part identifier, a semi-persistent scheduling configuration identifier, a cell group configuration identifier, or any combination thereof.

7. The method of claim 1, wherein the second sidelink grant comprises scheduling information for the first sidelink data message and scheduling information for the second sidelink data message.

8. The method of claim 7, wherein at least one of the scheduling information for the first sidelink data message and the scheduling information for the second sidelink data message comprises a sidelink priority, a sidelink time and frequency resource allocation, a sidelink demodulation reference signal pattern, a quantity of sidelink demodulation reference signal ports and corresponding sidelink demodulation reference signal identifiers, a modulation and coding scheme identifier, a modulation and coding scheme table identifier, a format for a physical sidelink feedback channel, a format of a second stage sidelink control information and corresponding offset value, a beam identifier for receiving or transmitting the second stage sidelink control information, the first sidelink data message or the second sidelink data message, a precoding matrix identifier, a transmit precoding matrix identifier, or any combination thereof.

9. The method of claim 7, wherein at least one of the scheduling information for the first sidelink data message and the scheduling information for the second sidelink data message comprises a hybrid automatic repeat request process identifier, new data indicator, a redundant version index, an identifier associated with the first wireless device or the second wireless device, an indication that hybrid automatic repeat request feedback is enabled, a cast type indicator, channel state information request indicator, a zone identifier, an indication of a communications range, or any combination thereof.

10. The method of claim 1, wherein the second sidelink grant comprises a reverse link grant corresponding to the second sidelink data message and a forward link grant corresponding to the first sidelink data message, the reverse link grant and the forward link grant indicating different sets of parameters.

11. The method of claim 1, wherein the first sidelink data message corresponds to a forward link transmission and the second sidelink data message corresponds to a reverse link transmission.

12. The method of claim 1, wherein the second sidelink grant comprises first stage sidelink control information and second stage sidelink control information.

13. The method of claim 1, wherein receiving the first sidelink grant is based at least in part on a capability of the first wireless device, a link quality between the first wireless device and the network device, or any combination thereof.

14. A method for wireless communication at a second wireless device, comprising:
receiving, from a first wireless device via a third set of resources, a sidelink grant for sidelink full-duplex communication between the first wireless device and the second wireless device, the sidelink grant indicating that a first set of resources is for reception of a first sidelink data message at the second wireless device from the first wireless device and further indicating that a second set of resources is for transmission of a second sidelink data message from the second wireless device to the first wireless device, wherein the first set of resources at least partially overlaps in time with the second set of resources;
receiving, from the first wireless device, the first sidelink data message via the first set of resources based at least in part on the sidelink grant; and
transmitting, to the first wireless device, the second sidelink data message via the second set of resources based at least in part on the sidelink grant.

15. The method of claim 14, further comprising:
generating, at the second wireless device, feedback information related to the first sidelink data message; and
transmitting, to the first wireless device, the feedback information related to the first sidelink data message.

16. The method of claim 14, further comprising:
generating, at the second wireless device, feedback information related to the first sidelink data message;

transmitting, to the first wireless device, the feedback information related to the first sidelink data message;
receiving, from the first wireless device, feedback information related to the second sidelink data message; and
transmitting, to a network device, the feedback information related to the second sidelink data message.

17. The method of claim 14, wherein the sidelink grant comprises scheduling information for the first sidelink data message and scheduling information for the second sidelink data message.

18. The method of claim 17, wherein at least one of the scheduling information for the first sidelink data message and the scheduling information for the second sidelink data message comprises a sidelink priority, a sidelink time and frequency resource allocation, a sidelink demodulation reference signal pattern, a quantity of sidelink demodulation reference signal ports and corresponding sidelink demodulation reference signal identifiers, a modulation and coding scheme identifier, a modulation and coding scheme table identifier, a format for a physical sidelink feedback channel, a format of a second stage sidelink control information and corresponding offset value, a beam identifier for receiving or transmitting the second stage sidelink control information, the first sidelink data message or the second sidelink data message, a precoding matrix identifier, a transmit precoding matrix identifier, or any combination thereof.

19. The method of claim 17, wherein at least one of the scheduling information for the first sidelink data message and the scheduling information for the second sidelink data message comprises a hybrid automatic repeat request process ID, new data indicator, a redundant version index, an identifier associated with the first wireless device or the second wireless device, an indication that hybrid automatic repeat request feedback is enabled, a cast type indicator, channel state information request indicator, a zone identifier, an indication of a communications range, or any combination thereof.

20. The method of claim 14, wherein the first sidelink data message corresponds to a forward link transmission and the second sidelink data message corresponds to a reverse link transmission.

21. The method of claim 14, wherein the sidelink grant comprises first stage sidelink control information and second stage sidelink control information.

22. An apparatus for wireless communication at a first wireless device, comprising:
at least one processor;
memory coupled with the at least one processor; and
instructions stored in the memory and executable by the at least one processor to cause the apparatus to:
receive, from a network device, a first sidelink grant for sidelink full-duplex communication between the first wireless device and a second wireless device, the first sidelink grant indicating that a first set of resources is for transmission of a first sidelink data message from the first wireless device to the second wireless device and further indicating that a second set of resources is for reception of a second sidelink data message at the first wireless device from the second wireless device, wherein the first set of resources at least partially overlaps in time with the second set of resources;
transmit, to the second wireless device via a third set of resources, a second sidelink grant indicating the second set of resources;
transmit, to the second wireless device, the first sidelink data message via the first set of resources based at least in part on the first sidelink grant, the second sidelink grant, or both; and receive, from the second wireless device, the second sidelink data message via the second set of resources based at least in part on the first sidelink grant, the second sidelink grant, or both.

23. The apparatus of claim 22, wherein the instructions are further executable by the at least one processor to cause the apparatus to:

generate, at the first wireless device, feedback information related to the second sidelink data message;

receive, from the second wireless device, feedback information related to the first sidelink data message; and transmit, to the network device, the feedback information related to the first sidelink data message and the feedback information related to the second sidelink data message based at least in part on the first sidelink grant.

24. The apparatus of claim 22, wherein the instructions are further executable by the at least one processor to cause the apparatus to:

generate, at the first wireless device, feedback information related to the second sidelink data message;

transmit, to the second wireless device, the feedback information related to the second sidelink data message;

receive, from the second wireless device, feedback information related to the first sidelink data message; and transmit, to the network device, the feedback information related to the first sidelink data message.

25. The apparatus of claim 22, wherein the first sidelink grant indicates a format of the second sidelink grant, a time gap between reception of the first sidelink grant and transmission of the second sidelink grant, a radio network temporary identifier for inclusion in the second sidelink grant, a user equipment (UE) identifier associated with a wireless device transmitting the second sidelink grant, a UE identifier associated with a wireless device receiving the second sidelink grant, or any combination thereof.

26. The apparatus of claim 22, wherein the first sidelink grant comprises scheduling information for the first sidelink data message and scheduling information for the second sidelink data message.

27. An apparatus for wireless communication at a second wireless device, comprising:

at least one processor;

memory coupled with the at least one processor; and instructions stored in the memory and executable by the at least one processor to cause the apparatus to:

receive, from a first wireless device via a third set of resources, a sidelink grant for sidelink full-duplex communication between the first wireless device and the second wireless device, the sidelink grant indicating that a first set of resources is for reception of a first sidelink data message at the second wireless device from the first wireless device and further indicating that a second set of resources is for transmission of a second sidelink data message from the second wireless device to the first wireless device, wherein the first set of resources at least partially overlaps in time with the second set of resources;

receive, from the first wireless device, the first sidelink data message via the first set of resources based at least in part on the sidelink grant; and transmit, to the first wireless device, the second sidelink data message via the second set of resources based at least in part on the sidelink grant.

28. The apparatus of claim 27, wherein the instructions are further executable by the at least one processor to cause the apparatus to:

generate, at the second wireless device, feedback information related to the first sidelink data message; and transmit, to the first wireless device, the feedback information related to the first sidelink data message.

29. The apparatus of claim 27, wherein the instructions are further executable by the at least one processor to cause the apparatus to:

generate, at the second wireless device, feedback information related to the first sidelink data message;

transmit, to the first wireless device, the feedback information related to the first sidelink data message;

receive, from the first wireless device, feedback information related to the second sidelink data message; and transmit, to a network device, the feedback information related to the second sidelink data message.

30. The apparatus of claim 27, wherein the sidelink grant comprises scheduling information for the first sidelink data message and scheduling information for the second sidelink data message.

* * * * *